(12) United States Patent
Okamoto

(10) Patent No.: US 9,342,874 B2
(45) Date of Patent: May 17, 2016

(54) NOISE DETERMINATION APPARATUS AND METHOD, AND NOISE FILTER

(71) Applicant: MegaChips Corporation, Osaka (JP)

(72) Inventor: Akira Okamoto, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 0 days.

(21) Appl. No.: 14/580,439

(22) Filed: Dec. 23, 2014

(65) Prior Publication Data

US 2015/0199799 A1 Jul. 16, 2015

(30) Foreign Application Priority Data

Jan. 16, 2014 (JP) .................. 2014-005804
Jan. 27, 2014 (JP) .................. 2014-012333

(51) Int. Cl.
| | | |
|---|---|---|
| *G06K 9/40* | (2006.01) | |
| *G06T 5/20* | (2006.01) | |
| *G06T 5/00* | (2006.01) | |
| *G06T 7/00* | (2006.01) | |
| *G06T 5/10* | (2006.01) | |
| *G06T 5/50* | (2006.01) | |

(52) U.S. Cl.
CPC ... *G06T 5/20* (2013.01); *G06K 9/40* (2013.01); *G06T 5/002* (2013.01); *G06T 5/10* (2013.01); *G06T 5/50* (2013.01); *G06T 7/0085* (2013.01); *G06T 2207/20148* (2013.01); *G06T 2207/20182* (2013.01); *G06T 2207/20192* (2013.01)

(58) Field of Classification Search
USPC .......... 382/260, 261, 254, 191, 298, 275; 345/428, 660; 358/1.9, 3.26, 3.27; 367/50; 375/350, E7.06; 378/105
See application file for complete search history.

(56) References Cited

U.S. PATENT DOCUMENTS

| | | | | |
|---|---|---|---|---|
| 7,079,700 B2* | 7/2006 | Shinbata | ................. | G06T 5/009 375/E7.06 |
| 7,099,417 B2* | 8/2006 | Siegel | ................ | H03H 17/0266 367/50 |
| 7,133,157 B2* | 11/2006 | Ito | ............................ | H04N 1/58 358/1.9 |
| 8,358,877 B2* | 1/2013 | Noguchi | .............. | H04N 19/176 382/236 |
| 8,537,179 B2* | 9/2013 | Moriya | ................... | G06T 5/004 345/428 |

FOREIGN PATENT DOCUMENTS

JP  5105215  12/2012

* cited by examiner

*Primary Examiner* — Anh Do
(74) *Attorney, Agent, or Firm* — Oblon, McClelland, Maier & Neustadt, L.L.P

(57) ABSTRACT

A technique for determining noise is provided that suppresses misrecognition of significant components in an image as noise in any image captured under any condition. A noise determination apparatus for determining noise in image data that is input in units of frames decomposes the image data into frequency components, samples a predetermined number of data pieces for low-frequency components that have relatively low frequencies and a predetermined number of data pieces for high-frequency components that have relatively high frequencies from the frequency components, and analyzes whether or not the image data includes an edge image, on the basis of a ratio of high-frequency data to low-frequency data.

26 Claims, 18 Drawing Sheets

F I G . 1
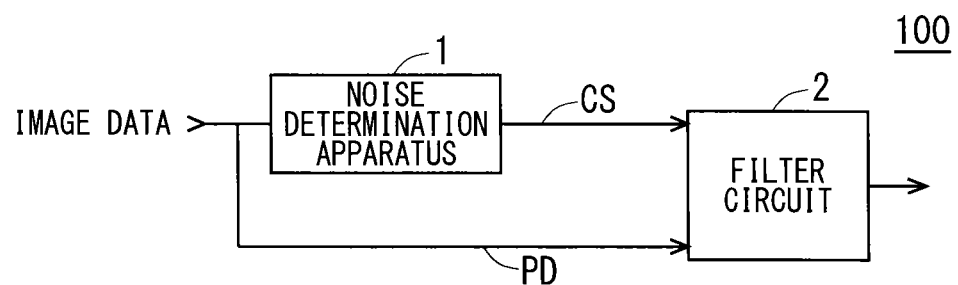

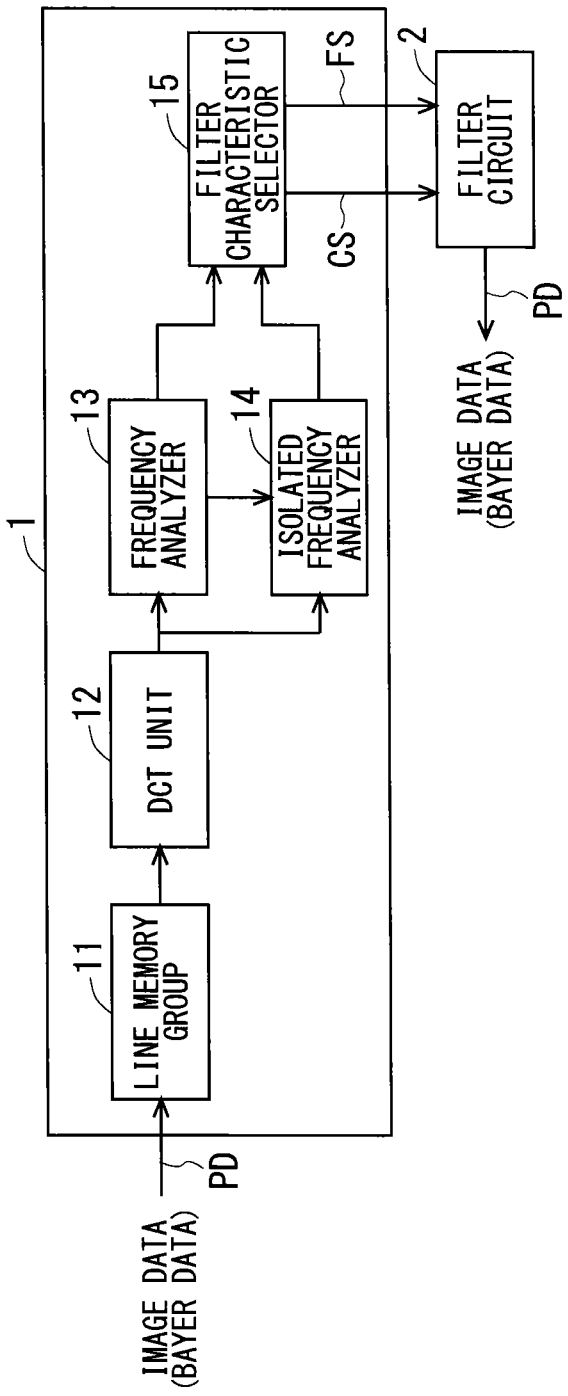

F I G . 5
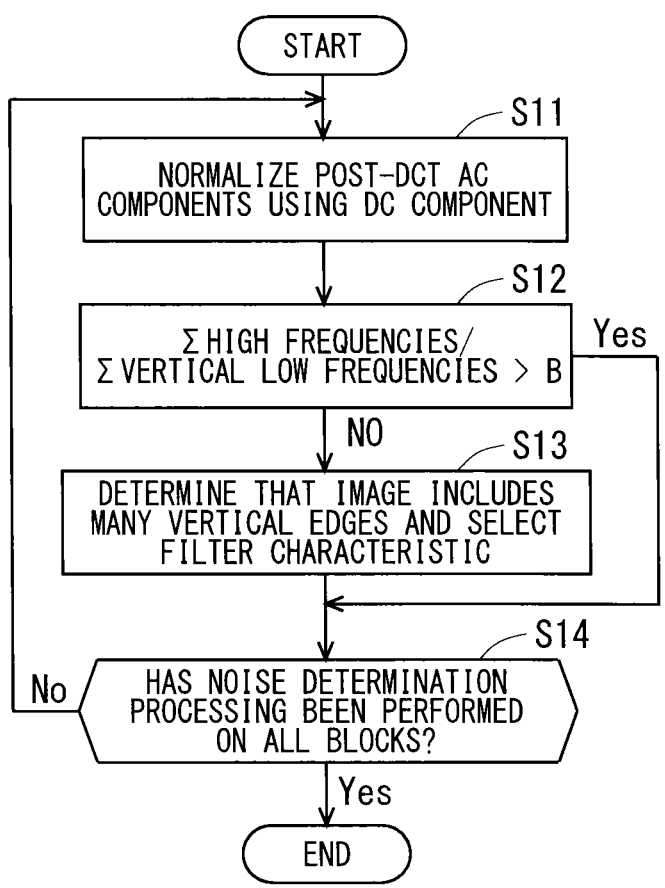

F I G . 1 1

| 16 | 16 | 16 | 255 | 255 | 255 | 255 | 255 |
|----|----|----|-----|-----|-----|-----|-----|
| 16 | 16 | 16 | 255 | 255 | 255 | 255 | 255 |
| 16 | 16 | 16 | 255 | 255 | 255 | 255 | 255 |
| 16 | 16 | 255 | 255 | 255 | 255 | 255 | 255 |
| 16 | 16 | 255 | 255 | 255 | 255 | 255 | 255 |
| 16 | 255 | 255 | 255 | 255 | 255 | 255 | 255 |
| 16 | 255 | 255 | 255 | 255 | 255 | 255 | 255 |
| 255 | 255 | 255 | 255 | 255 | 255 | 255 | 255 |

F I G . 1 2

| 16 | 16 | 16 | 16 | 16 | 16 | 16 | 255 |
|----|----|----|----|----|----|----|-----|
| 16 | 16 | 16 | 16 | 16 | 255 | 255 | 255 |
| 16 | 16 | 16 | 255 | 255 | 255 | 255 | 255 |
| 255 | 255 | 255 | 255 | 255 | 255 | 255 | 255 |
| 255 | 255 | 255 | 255 | 255 | 255 | 255 | 255 |
| 255 | 255 | 255 | 255 | 255 | 255 | 255 | 255 |
| 255 | 255 | 255 | 255 | 255 | 255 | 255 | 255 |
| 255 | 255 | 255 | 255 | 255 | 255 | 255 | 255 |

F I G . 1 3

| 16 | 16 | 16 | 16 | 16 | 255 | 255 | 255 |
|----|----|----|----|----|-----|-----|-----|
| 16 | 16 | 16 | 16 | 255 | 255 | 255 | 255 |
| 16 | 16 | 16 | 255 | 255 | 255 | 255 | 255 |
| 16 | 16 | 255 | 255 | 255 | 255 | 255 | 255 |
| 16 | 255 | 255 | 255 | 255 | 255 | 255 | 255 |
| 255 | 255 | 255 | 255 | 255 | 255 | 255 | 255 |
| 255 | 255 | 255 | 255 | 255 | 255 | 255 | 255 |
| 255 | 255 | 255 | 255 | 255 | 255 | 255 | 255 |

FIG. 14

| 16 | 16 | 16 | 16 | 255 | 255 | 255 | 255 |
|---|---|---|---|---|---|---|---|
| 16 | 16 | 16 | 255 | 255 | 255 | 255 | 255 |
| 16 | 16 | 255 | 255 | 255 | 255 | 255 | 255 |
| 16 | 255 | 255 | 255 | 255 | 255 | 255 | 255 |
| 255 | 255 | 255 | 255 | 255 | 255 | 255 | 255 |
| 255 | 255 | 255 | 255 | 255 | 255 | 255 | 255 |
| 255 | 255 | 255 | 255 | 255 | 255 | 255 | 255 |
| 255 | 255 | 255 | 255 | 255 | 255 | 255 | 255 |

FIG. 15

| 16 | 16 | 255 | 255 | 255 | 255 | 255 | 255 |
|---|---|---|---|---|---|---|---|
| 16 | 255 | 255 | 255 | 255 | 255 | 255 | 255 |
| 255 | 255 | 255 | 255 | 255 | 255 | 255 | 255 |
| 255 | 255 | 255 | 255 | 255 | 255 | 255 | 255 |
| 255 | 255 | 255 | 255 | 255 | 255 | 255 | 255 |
| 255 | 255 | 255 | 255 | 255 | 255 | 255 | 255 |
| 255 | 255 | 255 | 255 | 255 | 255 | 255 | 255 |
| 255 | 255 | 255 | 255 | 255 | 255 | 255 | 255 |

FIG. 16

| 16 | 16 | 16 | 16 | 16 | 16 | 16 | 255 |
|---|---|---|---|---|---|---|---|
| 16 | 16 | 16 | 16 | 16 | 255 | 255 | 255 |
| 16 | 16 | 16 | 255 | 255 | 255 | 255 | 255 |
| 16 | 16 | 255 | 255 | 255 | 255 | 255 | 255 |
| 16 | 16 | 255 | 255 | 255 | 255 | 255 | 255 |
| 16 | 255 | 255 | 255 | 255 | 255 | 255 | 255 |
| 16 | 255 | 255 | 255 | 255 | 255 | 255 | 255 |
| 255 | 255 | 255 | 255 | 255 | 255 | 255 | 255 |

F I G . 1 7

| 16 | 16 | 16 | 16 | 16 | 255 | 255 | 255 |
|---|---|---|---|---|---|---|---|
| 16 | 16 | 16 | 16 | 255 | 255 | 255 | 255 |
| 16 | 16 | 16 | 255 | 255 | 255 | 255 | 255 |
| 16 | 16 | 255 | 255 | 255 | 255 | 255 | 255 |
| 16 | 16 | 255 | 255 | 255 | 255 | 255 | 255 |
| 16 | 255 | 255 | 255 | 255 | 255 | 255 | 255 |
| 16 | 255 | 255 | 255 | 255 | 255 | 255 | 255 |
| 255 | 255 | 255 | 255 | 255 | 255 | 255 | 255 |

F I G . 1 8

| 16 | 16 | 16 | 16 | 16 | 16 | 16 | 255 |
|---|---|---|---|---|---|---|---|
| 16 | 16 | 16 | 16 | 16 | 255 | 255 | 255 |
| 16 | 16 | 16 | 255 | 255 | 255 | 255 | 255 |
| 16 | 16 | 255 | 255 | 255 | 255 | 255 | 255 |
| 16 | 255 | 255 | 255 | 255 | 255 | 255 | 255 |
| 255 | 255 | 255 | 255 | 255 | 255 | 255 | 255 |
| 255 | 255 | 255 | 255 | 255 | 255 | 255 | 255 |
| 255 | 255 | 255 | 255 | 255 | 255 | 255 | 255 |

F I G . 1 9
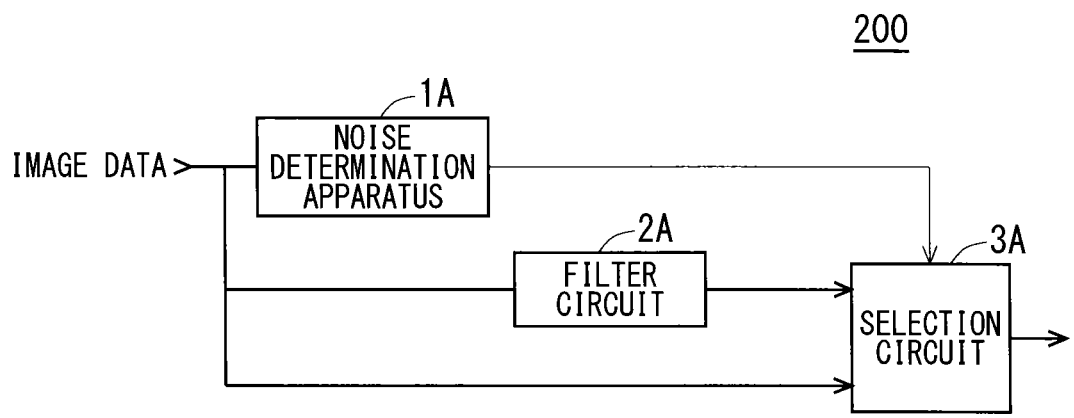

F I G . 2 5
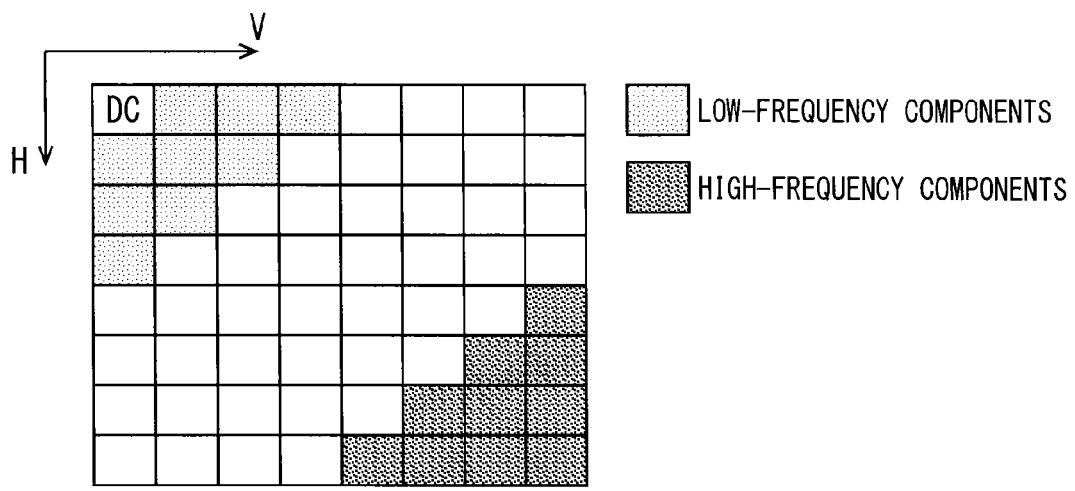
F I G . 2 6
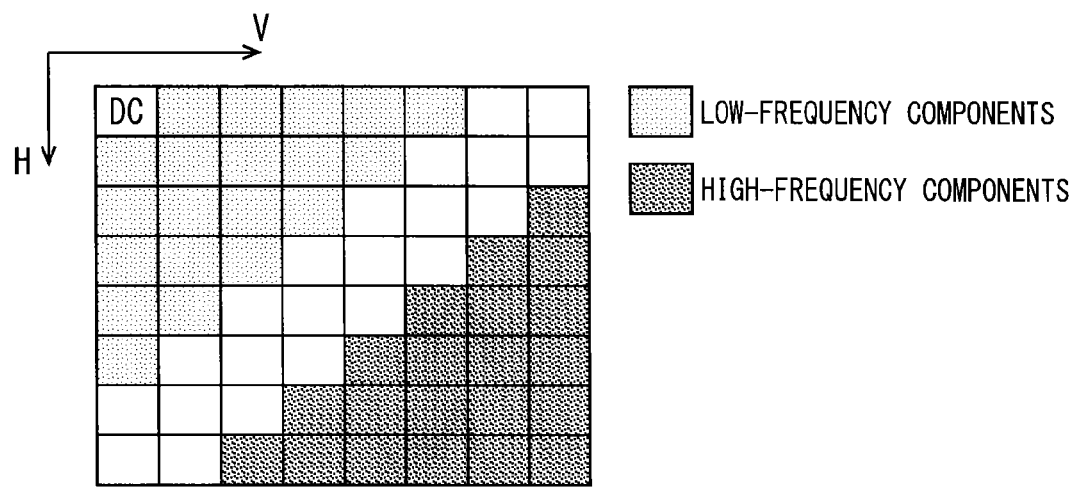

NOISE DETERMINATION APPARATUS AND METHOD, AND NOISE FILTER

BACKGROUND OF THE INVENTION

1. Field of the Invention

The present invention relates to a technique for determining noise, and in particular to a technique for determining noise in an image signal.

2. Description of the Background Art

Various techniques have conventionally been proposed to detect and remove noise in an image signal produced by an image sensor such as a solid-state image sensor.

For example, Japanese Patent Gazette No. 5105215 discloses a technique for detecting and removing noise included in chroma components.

Imaging devices using image sensors such as solid-state image sensors may be used as surveillance cameras, which are not limited for use in bright light and may be used in low light.

In the case of use in low light, it is difficult to discriminate between noise and significant components in the image. With conventional noise-detection techniques that unconditionally remove detected noise, which include Japanese Patent Gazette No. 5105215, there has been the possibility that significant components in the image will be misrecognized as noise and removed.

In addition, there is another problem in that although the ratio of noise is high in low light, the conventional noise-detection techniques, which include Japanese Patent Gazette No. 5105215, cannot effectively determine noise and accordingly cannot remove noise satisfactorily.

SUMMARY OF THE INVENTION

The present invention has been achieved in order to solve problems as described above, and it is an object of the present invention to provide a technique for determining noise, which is capable of determining noise while suppressing misrecognition of significant components as noise in any image captured under any condition.

A first aspect of a noise determination apparatus according to the present invention is a noise determination apparatus for determining noise in image data that is input in units of frames. The noise determination apparatus includes circuitry to decompose the image data into frequency components, sample a predetermined number of data pieces for low-frequency components that have relatively low frequencies and a predetermined number of data pieces for high-frequency components that have relatively high frequencies from the frequency components, and analyze whether or not the image data includes an edge image, on the basis of a ratio of high-frequency data to low-frequency data.

In a second aspect of the noise determination apparatus according to the present invention, the circuitry includes a frequency decomposer that divides one frame's worth of the image data into matrices of a predetermined number of pixels, the matrices serving as data blocks, and decomposes each data block into frequency components, a frequency analyzer that samples a predetermined number of low-frequency components and a predetermined number of high-frequency components from the frequency components of the data block obtained by the frequency decomposer to use the low-frequency components as the low-frequency data and use the high-frequency components as the high-frequency data, and analyzes whether or not the data block includes an edge image, on the basis of a ratio of the high-frequency data to the low-frequency data, and a filter characteristic selector that selects a filter characteristic of a filter that removes noise, on the basis of a result of the analysis performed by the frequency analyzer.

In a third aspect of the noise determination apparatus according to the present invention, the frequency analyzer sets a first sampling area in which the low-frequency data includes a greater number of horizontal frequency components than vertical frequency components, in a case where a ratio of the high-frequency data to the low-frequency data in the first sampling area is less than or equal to a predetermined threshold value, the frequency analyzer analyzes that the data block includes a horizontal edge image, and the filter characteristic selector selects a filter characteristic that does not remove the horizontal edge image.

In a forth aspect of the noise determination apparatus according to the present invention, the frequency analyzer sets a second sampling area in which the low-frequency data includes a greater number of vertical frequency components than horizontal frequency components, in a case where a ratio of the high-frequency data to the low-frequency data in the second sampling area is less than or equal to a predetermined threshold value, the frequency analyzer analyzes that the data block includes a vertical edge image, and the filter characteristic selector selects a filter characteristic that does not remove the vertical edge image.

In a fifth aspect of the noise determination apparatus according to the present invention, the frequency analyzer sets a third sampling area in which the low-frequency data includes equal numbers of vertical frequency components and horizontal frequency components, in a case where a ratio of the high-frequency data to the low-frequency data in the third sampling area is less than or equal to a predetermined threshold value, the frequency analyzer analyzes that the data block includes an edge image, and the filter characteristic selector selects a filter characteristic that does not remove the edge image.

In a sixth aspect of the noise determination apparatus according to the present invention, the frequency decomposer decomposes a data block into frequency components through a discrete cosine transform, and the frequency analyzer normalizes alternating current components among transform coefficients obtained through the discrete cosine transform performed by the frequency decomposer by dividing the alternating current components by a direct current component among the transform coefficients, and uses the normalized alternating current components as the low-frequency data and the high-frequency data.

In a seventh aspect of the noise determination apparatus according to the present invention, the circuitry further includes an isolated frequency analyzer that analyzes whether or not a frequency component is isolated from other frequency components to determine presence or absence of an isolated frequency. The isolated frequency analyzer analyzes whether or not the data block includes an edge image that is unable to be analyzed by the frequency analyzer, on the basis of the presence or absence of the isolated frequency, and in a case where the data block includes an edge image that is unable to be analyzed by the frequency analyzer, the filter characteristic selector selects a filter characteristic that does not remove the edge image.

In an eighth aspect of the noise determination apparatus according to the present invention, the frequency decomposer decomposes a data block into frequency components through a discrete cosine transform, and the isolated frequency analyzer normalizes alternating current components among transform coefficients that are obtained through the discrete cosine transform performed by the frequency decomposer by dividing the alternating current components by a direct current component among the transform coefficients, calculates an average value of all normalized alternating current components, calculates, for each of frequency components of the normalized alternating current components, the number of surrounding frequency components that have values greater than the average value, calculates the number of frequency components for which the calculated number of surrounding frequency components is less than a predetermined first threshold value, determines whether or not the calculated number of frequency components is less than a predetermined second threshold value, and if the calculated number of frequency components is less than the second threshold value, analyzes that the data block includes an edge image that is unable to be analyzed by the frequency analyzer.

In a ninth aspect of the noise determination apparatus according to the present invention, Bayer data serves as the image data.

A tenth aspect of the noise determination apparatus according to the present invention is a noise determination apparatus for determining presence or absence of noise in image data that is input in units of frames. The noise determination apparatus includes circuitry configured to decompose the image data into frequency components, sample a predetermined number of data pieces for low-frequency components that have relatively low frequencies and a predetermined number of data pieces for high-frequency components that have relatively high frequencies from the frequency components, and determine the presence or absence of noise on the basis of a ratio of high-frequency data to low-frequency data.

In an eleventh aspect of the noise determination apparatus according to the present invention, the circuitry includes a frequency decomposer that divides one frame's worth of the image data into matrices of a predetermined number of pixels, the matrices serving as data blocks, and decomposes each data block into frequency components, and a frequency analyzer that samples a predetermined number of low-frequency components and a predetermined number of high-frequency components from the frequency components of the data block obtained by the frequency decomposer to use the low-frequency components as the low-frequency data and use the high-frequency components as the high-frequency data, and analyzes the presence or absence of noise on the basis of whether or not a ratio of the high-frequency data to the low-frequency data is greater than a predetermined first threshold value.

In an twelfth aspect of the noise determination apparatus according to the present invention, the circuitry includes a single-frame noise determination unit that determines that the one frame's worth of the image data includes noise, in a case where the number of the data blocks that are determined to include noise by the frequency analyzer is greater than a predetermined threshold value.

In a thirteenth aspect of the noise determination apparatus according to the present invention, the circuitry includes a multiple-frame noise determination unit that determines that a moving image includes noise, in a case where a plurality of frames that are determined to include noise by the single-frame noise determination unit satisfy a predetermined determination condition.

In a fourteenth aspect of the noise determination apparatus according to the present invention, the circuitry includes a frequency decomposer that divides one frame's worth of the image data into matrices of a predetermined number of pixels, the matrices serving as data blocks, and decomposes each data block into frequency components, and a frequency analyzer that samples a predetermined number of low-frequency components and a predetermined number of high-frequency components from the frequency components of the data block obtained by the frequency decomposer to use the low-frequency components as the low-frequency data and use the high-frequency components as the high-frequency data, generates a data-integrated matrix by adding data pieces of corresponding frequency components in all of the data blocks that constitute the one frame's worth of the image data, and analyzes the presence or absence of noise on the basis of whether or not a ratio of the high-frequency data to the low-frequency data in the data-integrated matrix is greater than a predetermined first threshold value.

In a fifteenth aspect of the noise determination apparatus according to the present invention, the circuitry includes a multiple-frame noise determination unit that determines that a moving image includes noise, in a case where a plurality of frames that are determined to include noise by the frequency analyzer satisfies a predetermined determination condition.

In a sixteenth aspect of the noise determination apparatus according to the present invention, the determination condition is defined by a ratio of frames that include noise to a plurality of frames that constitute a moving image.

In a seventeenth aspect of the noise determination apparatus according to the present invention, the determination condition is defined by a continuous number of frames that include noise among a plurality of frames that constitute a moving image.

In an eighteenth aspect of the noise determination apparatus according to the present invention, the frequency decomposer decomposes a data block into frequency components through a discrete cosine transform, and the frequency analyzer normalizes alternating current components among transform coefficients obtained through the discrete cosine transform performed by the frequency decomposer by dividing the alternating current components by a direct current component among the transform coefficients, and uses the normalized alternating current components as the low-frequency data and the high-frequency data.

In a nineteenth aspect of the noise determination apparatus according to the present invention, the frequency analyzer analyzes the presence or absence of noise by further determining whether or not the high-frequency data that has been normalized is greater than a predetermined second threshold value.

In a twentieth aspect of the noise determination apparatus according to the present invention, Bayer data serves as the image data.

A first aspect of a noise determination method according to the present invention is performed by a noise determination apparatus for determining noise in image data that is input in units of frames. The method includes the steps of (a) decomposing the image data into frequency components, and (b) sampling a predetermined number of data pieces for low-frequency components that have relatively low frequencies and a predetermined number of data pieces for high-frequency components that have relatively high frequencies from the frequency components obtained in the step (a), and analyzing whether or not the image data includes an edge image, on the basis of a ratio of high-frequency data to low-frequency data.

A second aspect of the noise determination method according to the present invention is a noise determination method for determining presence or absence of noise in image data that is input in units of frames. The method includes the steps of (a) decomposing the image data into frequency components, and (b) sampling a predetermined number of data pieces for low-frequency components that have relatively low frequencies and a predetermined number of data pieces for high-frequency components that have relatively high frequencies from the frequency components obtained in the step (a), and determining the presence or absence of noise on the basis of a ratio of high-frequency data to low-frequency data.

A noise filter according to an aspect of the present invention filters frequency components that are obtained by decomposing image data.

The noise determination apparatus according to the present invention is capable of preventing edge components from being removed through filtering and is capable of suppressing removal of significant components in an image along with noise. The apparatus is also capable of relatively simply and easily analyzing the presence or absence of noise in any image captured under any condition.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram illustrating a configuration of a noise-removing apparatus that includes a noise determination apparatus according to a preferred embodiment of the present invention;

FIG. 2 is a block diagram illustrating a configuration of the noise determination apparatus according to the preferred embodiment of the present invention;

FIGS. 4 to 7 are flowcharts for explaining processing for determining noise, performed by the noise determination apparatus according to the preferred embodiment of the present invention;

FIGS. 11 to 18 illustrate structures of quantization matrix tables used to remove noise;

FIG. 19 is a block diagram illustrating a configuration of a noise-removing apparatus that includes a noise determination apparatus according to another preferred embodiment of the present invention;

FIGS. 25 and 26 show examples of how to set sampling areas.

DESCRIPTION OF THE PREFERRED EMBODIMENTS

First Preferred Embodiment

Figure 3:
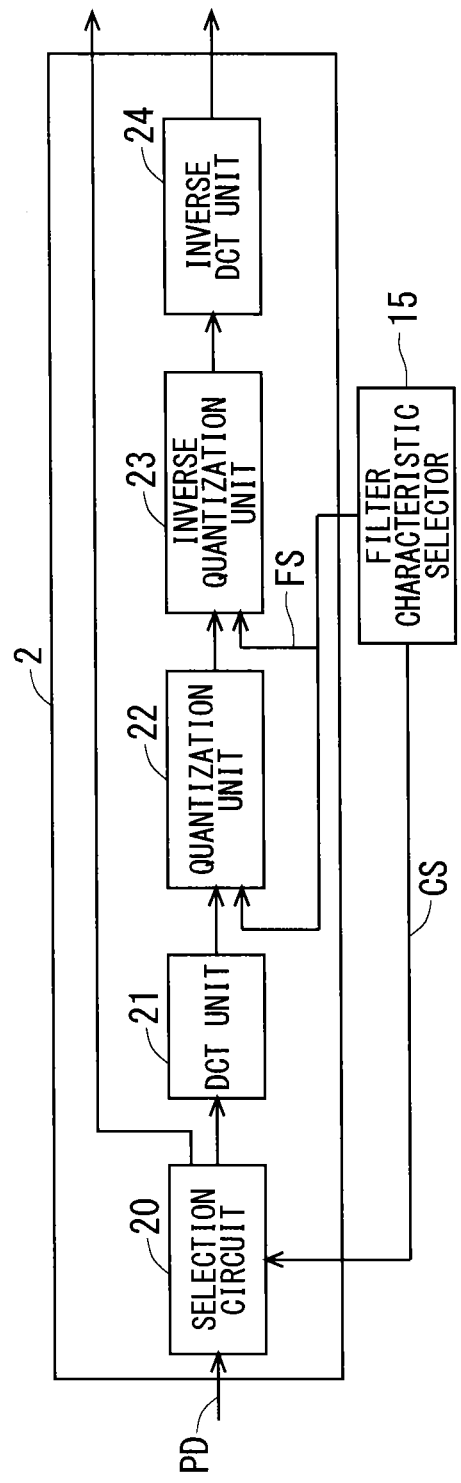
FIG. 3 is a block diagram illustrating a configuration of a filter circuit that removes noise on the basis of a result of determination performed by the noise determination apparatus according to the preferred embodiment of the present invention.

FIG. 1 is a block diagram illustrating a configuration of a noise-removing apparatus 100 that includes a noise determination apparatus according to a first preferred embodiment of the present invention.

As illustrated in FIG. 1, the noise-removing apparatus 100 includes a noise determination apparatus 1 that receives input of image data PD and determines whether or not the image data PD includes noise, and a filter circuit 2 that removes noise in the image data PD.

The filter circuit 2 receives input of a characteristic selection signal CS and the image data PD from the noise determination apparatus 1 and outputs the image data PD, either directly or after filtering.

FIG. 2 is a block diagram illustrating a configuration of the noise determination apparatus 1. As illustrated in FIG. 2, the noise determination apparatus 1 receives input of Bayer data serving as the image data PD and temporarily stores the Bayer data in a line memory group 11. As will be described later, the noise determination apparatus 1 processes one frame's worth of the image data PD in units of matrices of 8×8 or 4×4 pixels. The line memory group 11 thus includes seven line memories when the data is processed in units of 8×8 pixels, and it includes three line memories when the image data is processed in units of 4×4 pixels.

The Bayer data stored in the line memory group 11 is transmitted to a discrete cosine transform (DCT) unit 12 in units of 4×4 or 8×8 pixels in first-in, first-out (FIFO) order. The data is transmitted in succession until four or eight lines of the Bayer data have been transmitted.

The DCT unit 12 (frequency decomposer) performs a discrete cosine transform on the received Bayer data (hereinafter, referred to as a "Bayer data block") to decompose the data into frequency components, and outputs transform coefficients of the obtained frequency components.

The transform coefficients output from the DCT unit 12 are analyzed by a frequency analyzer 13 that analyzes noise included in the single frame in units of Bayer data blocks. The result of the analysis is transmitted to a filter characteristic selector 15.

The output of the DCT unit 12 and the result of the analysis performed by the frequency analyzer 13 are also transmitted to an isolated frequency analyzer 14 that analyzes an isolated frequency and transmits a result of the analysis to the filter characteristic selector 15.

The filter characteristic selector 15 generates a quantization matrix table for determining a filter characteristic, on the basis of the results of the analyses performed by the frequency analyzer 13 and the isolated frequency analyzer 14, and transmits, to the filter circuit 2, a filter characteristic selection signal FS that indicates a quantization matrix table and a control signal CS for selecting whether to filter the image data PD before output or to output the image data PD directly.

Note that the noise determination apparatus 1 is configured of, for example, a central processing unit (CPU), a random-access memory (RAM), a read-only memory (ROM), and a wired logic circuit. The functionality of the noise determination apparatus 1 is implemented by the CPU executing a program that is stored in and read out of the ROM.

FIG. 3 illustrates a configuration of the filter circuit 2. As illustrated in FIG. 3, the filter circuit 2 includes a selection circuit 20 that selects whether to filter the image data PD before output or to output the image data PD directly, a DCT unit 21 that performs a DCT on the image data PD, a quantization unit 22 that performs quantization processing on the data obtained from the DCT, an inverse quantization unit 23 that performs inverse quantization processing on the quantized data, and an inverse DCT unit 24 that performs an inverse DCT on the data obtained from the inverse quantization processing.

A selection operation performed by the selection circuit 20 is controlled by the control signal CS transmitted from the filter characteristic selector 15, and in the case of performing filtering, the image data PD is transmitted to the DCT unit 21.

Noise Determination Processing

Next, processing for determining edges among the processing for determining noise performed by the noise determination apparatus 1 will be described with reference to the flowcharts in FIGS. 4 to 7.

Determination of Horizontal Edges

First, determining horizontal edges will be described with reference to FIG. 4. Note that the following describes processing from the frequency analyzer 13 onward in FIG. 2, and a description of DCT processing, which is a known technique, will be omitted.

In step S1, the frequency analyzer 13 normalizes alternating current (AC) components in a matrix (corresponding to a Bayer data block of 8×8 pixels) of transform coefficients (DCT coefficients) output from the DCT unit 12, by dividing the AC components by a direct current (DC) component in the matrix.

Figure 8:
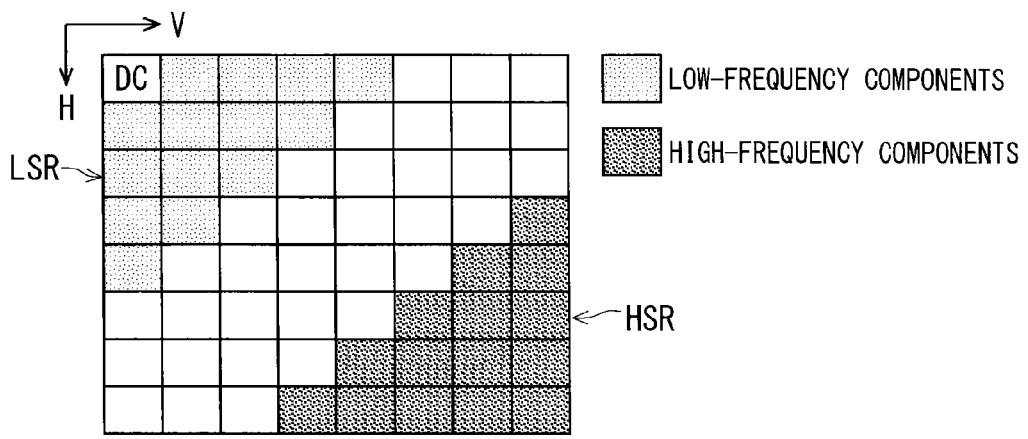
FIGS. 8 to 10 illustrate matrices of DCT coefficients, each matrix corresponding to a Bayer data block of 8×8 pixels.

Here, FIG. 8 illustrates the matrix of DCT coefficients, which corresponds to a Bayer data block of 8×8 pixels. In FIG. 8, the first element (at the top left corner) of the matrix is the DC component, elements along the horizontal direction of the matrix are vertical frequency components (V), and elements along the vertical direction of the matrix are horizontal frequency components (H). AC components that are closer to the DC component have lower frequencies, and AC components that are closer to a corner that is diagonally opposite to the DC component in the matrix have higher frequencies.

In FIG. 8, a sampling area of low-frequency components that are AC components located close to the DC component is shown as a sampling area LSR (low-frequency sampling area), and a sampling area of high-frequency components that are AC components located close to the corner diagonally opposite to the DC component is shown as a sampling area HSR (high-frequency sampling area).

Figure 9:
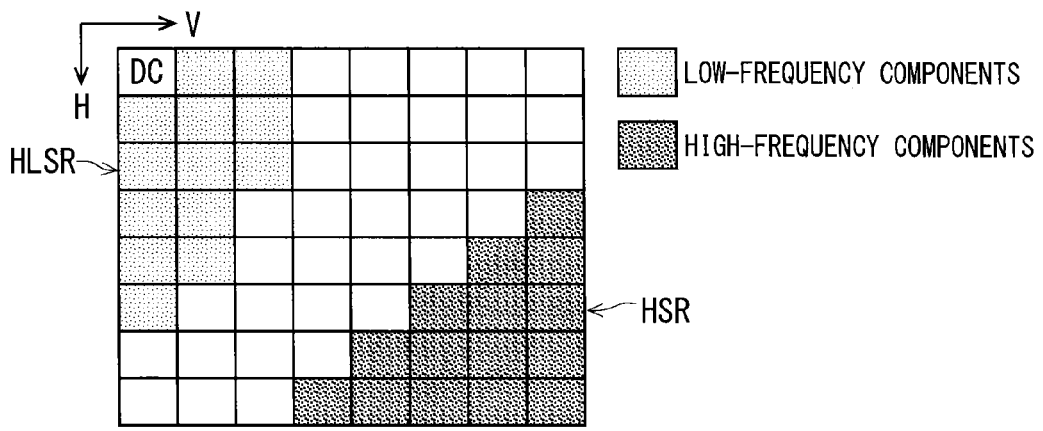

Note that the sampling areas can be set arbitrarily, and the frequency analyzer 13 sets a sampling area HLSR (horizontal low-frequency sampling area) that includes a greater number of horizontal frequency components (H) and a smaller number of vertical frequency components (V) as illustrated in FIG. 9. The frequency analyzer 13 then calculates a ratio ($\Sigma$ high frequencies/$\Sigma$ horizontal low frequencies) of the total number of DCT coefficients normalized in the sampling area HSR ($\Sigma$ high frequencies) to the total number of DCT coefficients normalized in the sampling area HLSR ($\Sigma$ horizontal low frequencies), and compares the calculated ratio with a predetermined threshold value A (step S2).

If the ratio exceeds the threshold value A, the procedure proceeds to step S4. If the ratio is less than or equal to the threshold value A, it is determined that the Bayer data block to be processed corresponds to an image with a great number of horizontal edges, and the procedure proceeds to step S3. Note that the threshold value A can be set arbitrarily.

Here, horizontal edges refer to edges along the vertical direction of the image, and a great number of horizontal edges can possibly cause the image to be misrecognized to include noise. The determination of horizontal edges is performed in order for horizontal edges not to be misrecognized as noise and removed.

Upon receiving the analysis result indicating that the Bayer data block to be processed corresponds to an image with a great number of horizontal edges, the filter characteristic selector 15 selects such a filter characteristic of the filter circuit 2 that the filter circuit 2 serves as a filter that is weak enough to conform to the image with a great number of horizontal edges (step S3).

In other words, the filter characteristic selector 15 sets a quantization matrix table with which horizontal edges will not be removed as noise, and transmits that quantization matrix table to the filter circuit 2.

Note that, in the case of selecting a filter characteristic in step S3, the selection circuit 20 of the filter circuit 2 is controlled so that filtering is performed on the image data PD that corresponds to the Bayer data block to be processed.

On the other hand, if it is determined in step S2 that the Bayer data block to be processed does not correspond to an image with a great number of horizontal edges, filtering is not performed on the image data PD.

Then, it is confirmed in step S4 whether or not the determination of noise in step S2 has been performed on all Bayer data blocks in the single frame, and if the noise determination processing has been performed on all of the Bayer data blocks, the determination processing and filtering on that frame ends. If there is another Bayer data block that has not yet undergone the determination processing, the processing from step S1 onward is repeated.

Determination of Vertical Edges

Next is a description of determining vertical edges with reference to FIG. 5. Note that step S11 is the same processing step as step S1 described with reference to FIG. 4, and therefore a description thereof will be omitted.

Figure 10:
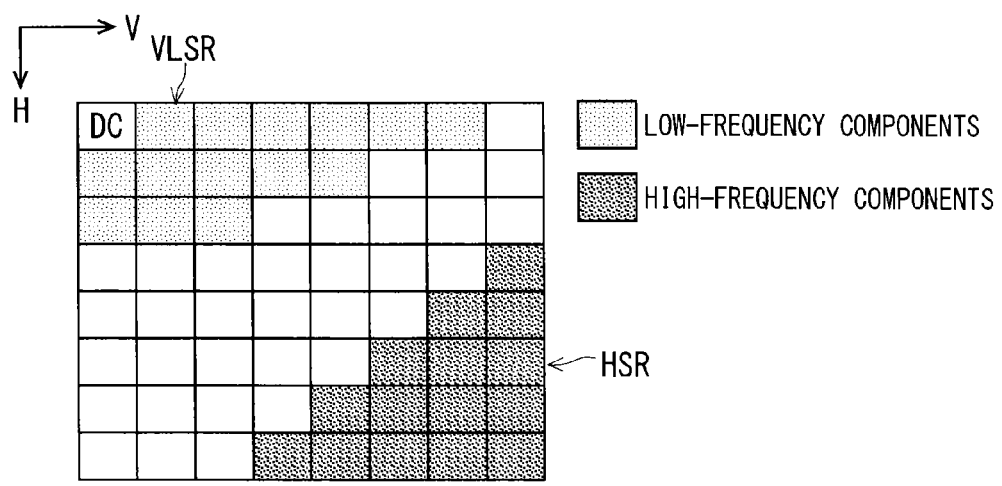

The frequency analyzer 13 sets a sampling area VLSR (vertical low-frequency sampling area) that includes a greater number of vertical frequency components (V) and a smaller number of horizontal frequency components (H) as illustrated in FIG. 10. The frequency analyzer 13 then calculates a ratio ($\Sigma$ high frequencies/$\Sigma$ vertical low frequencies) of the total number of DCT coefficients normalized in the sampling area HSR ($\Sigma$ high frequencies) to the total number of DCT coefficients normalized in the sampling area VLSR ($\Sigma$ vertical low frequencies), and compares the calculated ratio with a predetermined threshold value B (step S12).

If the ratio exceeds the threshold value B, the procedure proceeds to step S14. If the ratio is less than or equal to the threshold value B, it is determined that the Bayer data block to be processed corresponds to an image with a great number of vertical edges, and the procedure proceeds to step S13. Note that the threshold value B can be set arbitrarily.

Here, vertical edges refer to edges along the horizontal direction of the image, and a great number of vertical edges can possibly cause the image to be misrecognized to include noise. The determination of vertical edges is performed in order for vertical edges not to be misrecognized as noise and removed.

Upon receiving the analysis result indicating that the Bayer data block to be processed corresponds to an image with a great number of vertical edges, the filter characteristic selector 15 selects such a filter characteristic of the filter circuit 2 that the filter circuit 2 serves as a filter that is weak enough to conform to the image with a great number of vertical edges (step S13).

In other words, the filter characteristic selector 15 sets a quantization matrix table with which vertical edges will not be removed as noise, and transmits that quantization matrix table to the filter circuit 2.

Note that, in the case of selecting a filter characteristic in step S13, the selection circuit 20 of the filter circuit 2 is controlled so that filtering is performed on the image data PD that corresponds to the Bayer data block to be processed.

On the other hand, if it is determined in step S12 that the Bayer data block to be processed does not correspond to an image with a great number of vertical edges, filtering is not performed on the image data PD.

Then, it is confirmed in step S14 whether or not the noise determination in step S12 has been performed on all Bayer data blocks in the single frame. If the noise determination processing has been performed on all of the Bayer data blocks, the determination processing and filtering on that frame ends. If there is another Bayer data block that has not yet undergone the determination processing, the processing from step S11 onward is repeated.

Determination of Horizontal and Vertical Edges

Figure 6:
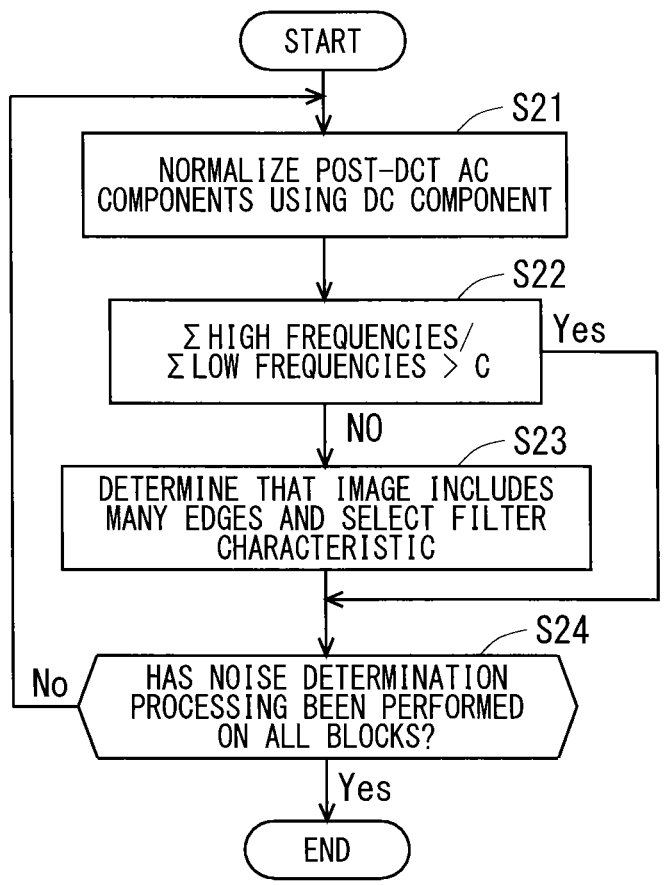

Next is a description of determining edges with reference to FIG. 6. Note that step S21 is the same processing step as step S1 described with reference to FIG. 4, and therefore a description of thereof will be omitted.

The frequency analyzer 13 sets the sampling areas LSR and HSR that each include equal numbers of vertical frequency components (V) and horizontal frequency components (H) as illustrated in FIG. 8. The frequency analyzer 13 then calculates a ratio (Σ high frequencies/Σ low frequencies) of the total number of DCT coefficients normalized in the sampling area HSR (Σ high frequencies) to the total number of DCT coefficients normalized in the sampling area LSR (Σ low frequencies), and compares the calculated ratio with a predetermined threshold value C (step S22).

If the ratio exceeds the threshold value C, the procedure proceeds to step S24. If the ratio is less than or equal to the threshold value C, it is determined that the Bayer data block to be processed corresponds to an image with a great number of edges (which includes both vertical and horizontal edges), and the procedure proceeds to step S23. Note that the threshold value C can be set arbitrarily.

Here, a great number of edges can possibly cause the image to be misrecognized to include noise. The determination of horizontal and vertical edges is performed in order for edges not to be misrecognized as noise and removed.

Upon receiving the analysis result indicating that the Bayer data block to be processed corresponds to an image with a great number of edges, the filter characteristic selector 15 selects such a filter characteristic of the filter circuit 2 that the filter circuit 2 serves as a filter that is weak enough to conform to the image with a great number of edges (step S23).

In other words, the filter characteristic selector 15 sets a quantization matrix table with which edges will not be removed as noise, and transmits that quantization matrix table to the filter circuit 2.

Note that, in the case of selecting a filter characteristic in step S23, the selection circuit 20 of the filter circuit 2 is controlled so that filtering is performed on the image data PD that corresponds to the Bayer data block to be processed.

On the other hand, if it is determined in step S22 that the Bayer data block to be processed does not correspond to an image with a great number of edges, filtering is not performed on the image data PD.

Then, it is confirmed in step S24 whether or not the noise determination in step S22 has been performed on all Bayer data blocks in the single frame. If the noise determination processing has already been performed on all of the Bayer data blocks, the determination processing and filtering on that frame ends. If there is another Bayer data block that has not yet undergone the determination processing, the processing from step S21 onward is repeated.

Combination of Edge Determination

The different types of edge determination described with reference to FIGS. 4 to 6 may each be used independently, or some or all of them may be combined.

Figure 4:
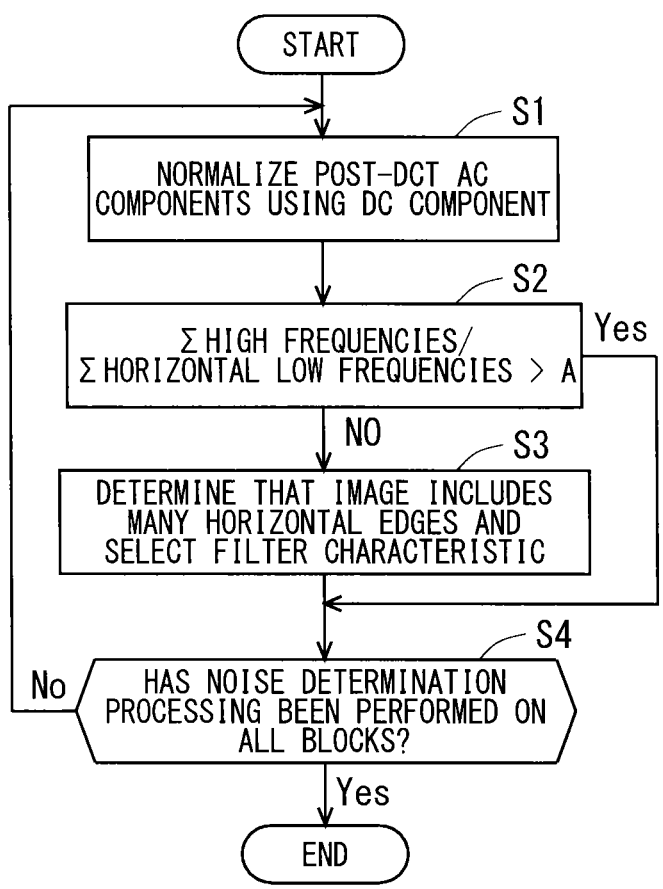

As one example, the determination of horizontal edges is performed in step S2 of FIG. 4, and if it is determined that the Bayer data block to be processed does not correspond to an image with a great number of horizontal edges, then the determination of vertical edges is performed as in step S12 of FIG. 5. If it is determined that the Bayer data block to be processed does not correspond to an image with a great number of vertical edges, then the determination of edges is performed as in step S22 of FIG. 6.

Combining different types of edge determination in this way allows an image with various types of edges to be filtered on the basis of an appropriate filter characteristic.

Analysis of Isolated Frequency

Figure 7:
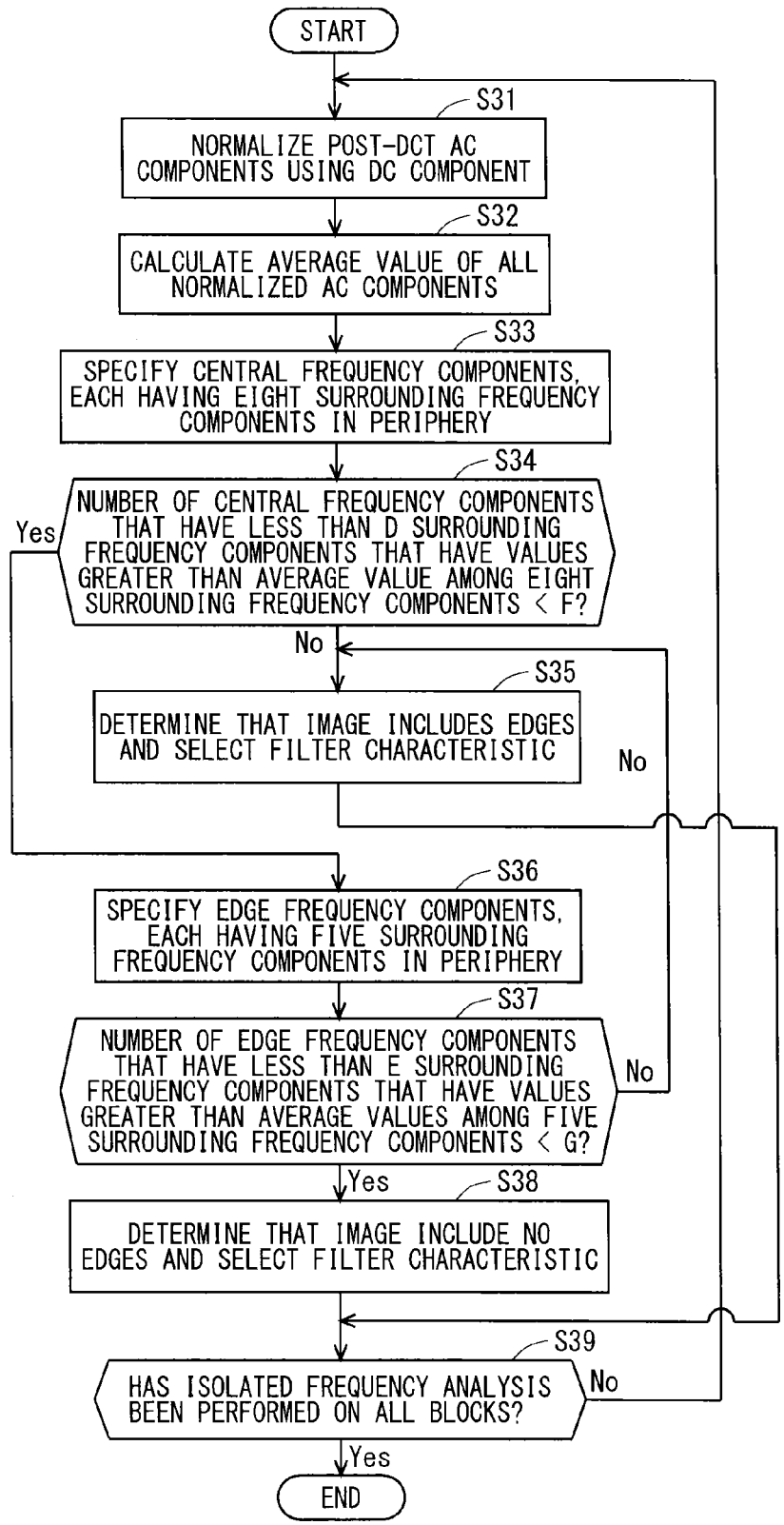

Next is a description of analysis of isolated frequencies, performed by the isolated frequency analyzer 14, with reference to the flowchart in FIG. 7.

The isolated frequencies refers to frequency components that are isolated from other frequency components. Removing isolated frequencies leads to noise reduction, but the presence of edges of special forms can possibly be misrecognized as the presence of a great number of isolated frequencies.

The isolated frequency analyzer 14 confirms the presence or absence of isolated frequencies, and if there are a great number of isolated frequencies, the isolated frequency analyzer 14 transmits that information to the filter characteristic selector 15.

Note that the isolated frequency analyzer 14 also receives the result of the analysis performed by the frequency analyzer 13, and analyzes isolated frequencies only when the analysis result from the frequency analyzer 13 indicates that any type of edges has not been detected.

In step S31 of FIG. 7, the isolated frequency analyzer 14 normalizes AC components in the matrix of DCT coefficients output from the DCT unit 12, by dividing the AC components by the DC component in the matrix.

The isolated frequency analyzer 14 then calculates an average value of all normalized AC components (in the present example, 63 AC components) (step S32).

Next, in step S33, the isolated frequency analyzer 14 specifies frequency components that each have eight frequency components in the periphery thereof, from among the 63 AC components. This is the process for confirming whether or not each of the 63 frequency components or AC components has eight frequency components in the periphery thereof, in other words, the process for specifying a frequency component that has eight frequency components in the periphery thereof, i.e., a central frequency component that is surrounded by eight frequency components. Note that frequency components to be specified are not the ones that constitute the four sides of the Bayer data block, so the frequency components that constitute the four sides of the Bayer data block may be excluded from those to be processed in step S33.

If frequency components (central frequency components) that are each surrounded by eight frequency components are specified in step S33, the isolated frequency analyzer 14 calculates, for each of the central frequency components, the number of surrounding frequency components that have values greater than the average value calculated in step S32 from among the eight surrounding frequency components, and then calculates the number of central frequency components for which the calculated number of surrounding frequency components is less than a predetermined threshold value D. Such central frequency components can be said to be isolated frequencies, but there are two possible situations where the isolated frequencies merely represent noise and where the isolated frequencies represent an edge of special form. Thus, it is determined whether or not the calculated number of central frequency components is less than a predetermined threshold value F (step S34), and if the number is greater than or equal to the threshold value F, it is determined that the Bayer data block to be processed corresponds to an image with an edge of special form, instead of an image that includes noise.

In other words, a small number of AC components that have values greater than the average value suggests the presence of isolated frequencies, and a great number of isolated frequencies suggests the possibility of the presence of an edge of special form that cannot be analyzed by the frequency analyzer 13. Thus, if a plurality of central frequency components specified in step S33 includes a total of F or more central frequency components that each have less than D surrounding frequency components that have values greater than the average value (No in step S34), it is determined that the Bayer data block to be processed corresponds to an image with an edge of special form, and the procedure proceeds to step S35. Note that the threshold values D and F can be set arbitrarily.

On the other hand, if it is determined in step S34 that the calculated number of central frequency components is less than F (Yes), the procedure proceeds to step S36.

In step S36, frequency components that each have five frequency components in the periphery thereof are specified from among the 63 AC components. This is the process for confirming whether or not each of the 63 AC components has five frequency components in the periphery thereof, in other words, the process for specifying frequency components that each have five frequency components in the periphery thereof, i.e., frequency components that are not the ones located at the corners, from among the frequency components that constitute the four sides of the Bayer data block. Note that frequency components to be specified are only the ones that constitute the four sides of the Bayer data block, and therefore the other frequency components may be excluded from those to be processed in step S36.

If frequency components (edge frequency components) that are each surround by five frequency components are specified in step S36, the isolated frequency analyzer 14 calculates, for each of the edge frequency components, the number of surrounding frequency components that have values greater than the average value calculated in step S32 from among the five surrounding frequency components, and then calculates the number of edge frequency components for which the calculated number of surrounding frequency components is less than a predetermined threshold value E. Such edge frequency components can be said to be isolated frequencies, but there are two possible situations where the isolated frequencies merely represent noise and where the isolated frequencies represent an edge of special form. Thus, it is determined whether or not the calculated number of edge frequency components is less than a predetermined threshold value G (step S37), and if the number is greater than or equal to the threshold value G, it is determined that the Bayer data block to be processed corresponds to an image with an edge of special form, instead of an image that includes noise.

In other words, a small number of AC components that have values greater than the average values suggests the presence of isolated frequencies, and a great number of isolated frequencies suggests the possibility of the presence of an edge of special form that cannot be analyzed by the frequency analyzer 13. Thus, if a plurality of edge frequency components specified in step S36 includes a total of G or more edge frequency components that each have less than E surrounding frequency components that have values greater than the average value (No in step S37), it is determined that the Bayer data block to be processed corresponds to an image with an edge of special form, and the procedure proceeds to step S35. Note that the threshold values E and G can be set arbitrarily.

On the other hand, if it is determined in step S37 that the calculated number of edge frequency components is less than G (YES), it is determined that the Bayer data block to be processed does not correspond to an image with an edge of special form, and the procedure proceeds to step S38.

In step S35, upon receiving, from the isolated frequency analyzer 14, the analysis result indicating that the Bayer data block to be processed corresponds to an image with an edge of special form, the filter characteristic selector 15 selects such a filter characteristic of the filter circuit 2 that the filter circuit 2 serves as a filter that is weak enough to leave the edge.

In other words, the filter characteristic selector 15 sets a quantization matrix table with which an edge of special form will not be removed, and transmits that quantization matrix table to the filter circuit 2.

Note that, in the case of selecting a filter characteristic in step S35, the selection circuit 20 of the filter circuit 2 is controlled so that filtering is performed on the image data PD that corresponds to the Bayer data block to be processed.

Then, it is confirmed in step S39 whether or not the analysis of isolated frequencies have been performed on all of the Bayer data blocks, and if the analysis have been completed, a series of processes ends. If there is another Bayer data block that has not been analyzed yet, the processing from step S31 onward is repeated.

On the other hand, when having received the analysis result indicating that the Bayer data block to be processed does not correspond to an image with an edge of special form from the isolated frequency analyzer 14, the filter characteristic selector 15 selects such a filter characteristic of the filter circuit 2 that the filter circuit 2 serves as a filter that conforms to an image with no edges (step S38).

Then, it is confirmed in step S39 whether or not the analysis of isolated frequencies have been performed on all of the Bayer data blocks, and if the analysis has been completed, a series of processes ends. If there is another Bayer data block that has not been analyzed yet, the processing from step S31 onward is repeated.

Here, the accuracy of determination can be improved by performing the above-described determination processing on each of four colors of the input Bayer data, namely, green of blue side (Gb), green of red side (Gr), red (R), and blue (B). Alternatively, the above-described determination processing may be performed on only Gb or Gr data because the green components include luminance information.

Combination with Typical Edge Detection Technique

The Sobel method, for example, is typically used to detect edges in a certain area of an image.

By combining the edge detection techniques described with reference to FIGS. 4 to 7 and the edge detection technique using the Sobel method, an image that includes more various types of edges can be filtered based on an appropriate filter characteristic.

For example, if any type of edges is not detected by any of the edge detection techniques described with reference to FIGS. 4 to 7 (or a combination of the edge detection techniques), the Sobel method is used to detect edges, and if there are few edges that have been detected, the filter characteristic of the filter circuit 2 is selected so that the filter circuit 2 serves as a strong filter in consideration of the determination result that the image does not include edges.

In other words, since there are few edges, a quantization matrix table with which noise will be removed is set and transmitted to the filter circuit 2 without consideration of edges. This quantization matrix table realizes the functionality of a filter that removes both high and low frequencies.

Note that if a great number of edges are detected through the edge detection using the Sobel method, the filter characteristic of the filter circuit 2 is selected so that the filter circuit 2 serves as a strong filter in consideration of the determination result that the image includes some types of edges.

Filtering

Next is a description of filtering performed by the filter circuit 2. As illustrated in FIG. 3, the filter circuit 2 includes the DCT unit 21 that performs a DCT on the image data PD, the quantization unit 22 that performs quantization processing on the data obtained from the DCT, the inverse quantization unit 23 that performs inverse quantization processing on the quantized data, and the inverse DCT unit 24 that performs an inverse DCT on the data obtained from the inverse quantization processing.

The quantization unit 22 quantizes data obtained from the DCT by dividing the data using a predetermined quantization matrix table. This process corresponds to filtering. Filter strength can be changed arbitrarily by changing the quantization matrix table. A signal used to determine a quantization matrix table is the filter characteristic selection signal FS. The filter characteristic selection signal FS may be used to select a quantization matrix table from among a plurality of pre-provided quantization matrix tables, or it may indicate a quantization matrix table that is generated by the filter characteristic selector 15.

Note that the image data can be restored by the inverse quantization unit 23 performing inverse quantization processing on the quantized data and the inverse DCT unit 24 performing an inverse DCT on the data obtained from the inverse quantization processing. This restored image data corresponds to filtered image data.

The inverse quantization processing performed by the inverse quantization unit 23, which is the process for multiplying the quantized data using a predetermined quantization matrix table, also uses a quantization matrix table. A signal used to determine this quantization matrix table is the filter characteristic selection signal FS. The filter characteristic selection signal FS may be used to select a quantization matrix table from among a plurality of pre-provided quantization matrix tables, or it may indicate a quantization matrix table that is generated by the filter characteristic selector 15. Note that the tables used by the quantization unit 22 and the inverse quantization unit 23 are not the same, but since they are used as a pair, the same filter characteristic selection signal FS is provided to the quantization unit 22 and the inverse quantization unit 23 in FIG. 3.

Examples of Quantization Matrix Table

The following describes examples of the quantization matrix table with reference to FIGS. 11 to 18. Note that the quantization matrix table may be provided in advance and used by the filter characteristic selector 15, or it may be generated each time by the filter characteristic selector 15 on the basis of the analysis results received from the frequency analyzer 13 and the isolated frequency analyzer 14.

Table for Horizontal Edges

FIG. 11 illustrates a quantization matrix table that is provided to the filter circuit 2 in order not to remove horizontal edges as noise when the determination of horizontal edges described with reference to FIG. 4 shows that the Bayer data block to be processed corresponds to an image with a great number of horizontal edges.

As illustrated in FIG. 11, the quantization matrix table gives significant numerical values to only components in a low-frequency area that is set to include a greater number of horizontal frequency components than vertical frequency components as in the matrix of DCT coefficients in FIG. 9, and gives a maximum value of "255" to all the remaining components in the other area. Note that the significant numerical values can be set arbitrarily.

This provides a filter characteristic that leaves only AC components that are given significant numerical values and removes the other AC components.

Table for Vertical Edges

FIG. 12 illustrates a quantization matrix table that is provided to the filter circuit 2 in order not to remove vertical edges as noise when the determination of vertical edges described with reference to FIG. 5 shows that the Bayer data block to be processed corresponds to an image with a great number of vertical edges.

As illustrated in FIG. 12, the quantization matrix table gives significant numerical values to only components in a low-frequency area that is set to include a greater number of vertical frequency components than horizontal frequency components as in the matrix of DCT coefficients in FIG. 10, and gives a maximum value of "255" to all the remaining components in the other area.

This provides a filter characteristic that leaves only AC components that are given significant numerical values and removes the other AC components.

Table for Horizontal and Vertical Edges

FIG. 13 illustrates a quantization matrix table that is provided to the filter circuit 2 in order not to remove horizontal and vertical edges as noise when the edge determination described with reference to FIG. 6 shows that the Bayer data block to be processed corresponds to an image with a great number of both horizontal and vertical edges.

As illustrated in FIG. 13, the quantization matrix table gives significant numerical values to only components in a low-frequency area that is set to include equal numbers of horizontal frequency components and vertical frequency components as in the matrix of DCT coefficients in FIG. 8, and gives a maximum value of "255" to all the remaining components in the other area.

This provides a filter characteristic that leaves only AC components that are given significant numerical values and removes the other AC components.

Table for Edges Obtained through Analysis of Isolated Frequencies

FIG. 14 illustrates a quantization matrix table that is provided to the filter circuit 2 in order not to remove an edge of special form as noise when the analysis of isolated frequencies described with reference to FIG. 7 shows that the Bayer data block to be processed corresponds to an image that includes an edge of special form at an edge or in any other portion.

As illustrated in FIG. 14, the quantization matrix table is set to have a low-frequency area that includes equal numbers of horizontal frequency components and vertical frequency components, the area being smaller than the corresponding area of the quantization matrix table in FIG. 13. This increases the number of AC components to be removed, thus providing a stronger filter characteristic.

Table for Edges Detected Using Sobel Method

FIG. 15 illustrates a quantization matrix table that is provided to the filter circuit 2 to remove noise without consideration of edges when few edges are detected even using the Sobel method.

As illustrated in FIG. 15, the quantization matrix table is set to have a low-frequency area that includes equal numbers of horizontal frequency components and vertical frequency components, the area being smaller than the corresponding area of the quantization matrix table in FIG. 14. This increases the number of AC components to be removed, thus providing a stronger filter characteristic.

Table for Edges Detected Using Combination of Edge Determination Techniques

As described previously, in the case of using a combination of different types of edge determination techniques described with reference to FIGS. 4 to 6, a quantization matrix table different from that used in the case of using a single edge determination technique is used.

For example, FIG. 16 illustrates a quantization matrix table that is provided to the filter circuit 2 when the three types of edge determination techniques described with reference to FIGS. 4 to 6 are used in combination. The quantization matrix table is set to have a low-frequency area that includes equal numbers of horizontal frequency components and vertical frequency components, the area being larger than the corresponding area of the quantization matrix table in FIG. 8.

This provides a filter characteristic that removes neither horizontal nor vertical edges as noise.

FIG. 17 illustrates a quantization matrix table that is provided to the filter circuit 2 when the two types of edge determination techniques described with reference to FIGS. 4 and 6 are used in combination. The quantization matrix table is set to have a greater number of significant vertical frequency components than in the quantization matrix table in FIG. 11.

This provides a filter characteristic that prevents not only horizontal edges but also edges in general from being removed as noise.

FIG. 18 illustrates a quantization matrix table that is provided to the filter circuit 2 when the two types of edge determination techniques described with reference to FIGS. 5 and 6 are used in combination. This quantization matrix table is set to include a greater number of significant horizontal frequency components than in the quantization matrix table in FIG. 12.

This provides a filter characteristic that prevents not only vertical edges but also edges in general from being removed as noise.

Advantageous Effects

As described above, in the first preferred embodiment according to the present invention, the frequency analyzer 13 and the isolated frequency analyzer 14 detect edge components, and if edge components are detected, a weak filter is used in order not to remove those edges. It is thus possible to prevent edge components from being removed through filtering and to suppress undesirable removal of significant components in the image along with noise.

In addition, noise can be removed reliably because a strong filter is used when no edge components are detected.

Use of a noise filter that performs filtering on frequency components that are obtained by decomposing image data suppresses undesirable removal of significant components in the image along with noise in the process of noise removal.

Note that if the noise determination apparatus and the filter circuit described above are mounted along with a codec on an image processing apparatus or the like, there is an effect of being able to determine the types of edge components and the presence or absence of noise with a simpler circuit configuration because the DCT unit and the quantization unit of the codec can be shared.

Second Preferred Embodiment

FIG. 19 is a block diagram illustrating a configuration of a noise-removing apparatus 200 that includes a noise determination apparatus according to a second preferred embodiment of the present invention.

As illustrated in FIG. 19, the noise-removing apparatus 200 includes a noise determination apparatus 1A that receives input of image data and determines whether or not the image data includes noise, a filter circuit 2A that removes noise included in the image data, and a selection circuit 3A that selects and outputs either filtered image data output from the filter circuit 2A or non-filtered image data, on the basis of a result of noise determination performed by the noise determination apparatus 1A.

Figure 20:
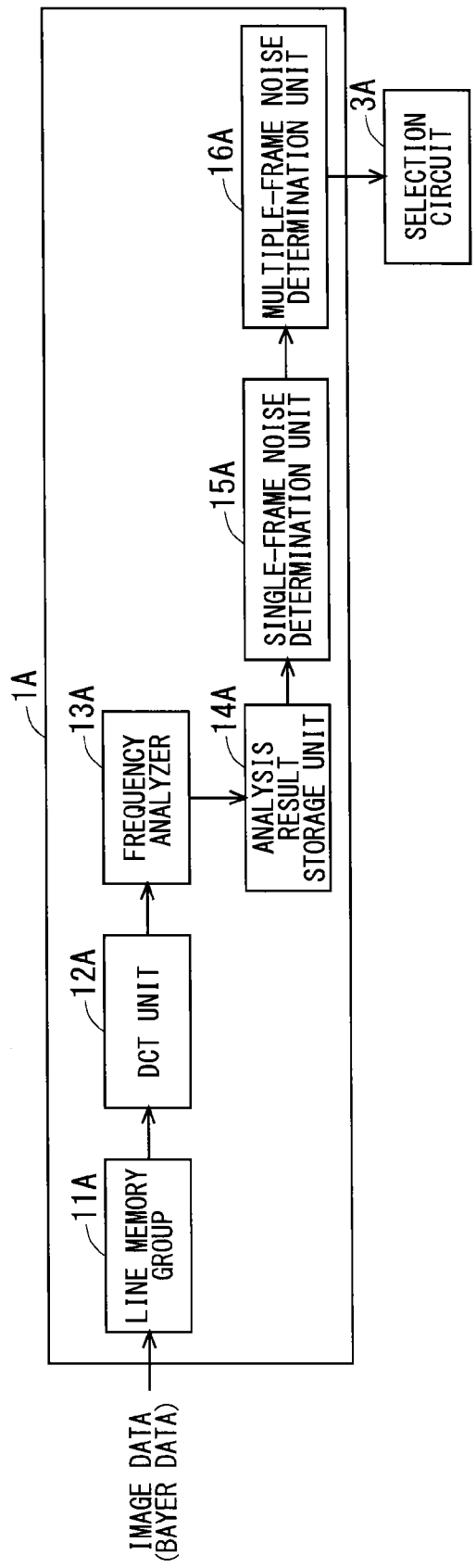
FIG. 20 is a block diagram illustrating a configuration of the noise determination apparatus according to the preferred embodiment of the present invention.

FIG. 20 is a block diagram illustrating a configuration of the noise determination apparatus 1A. As illustrated in FIG. 20, the noise determination apparatus 1A receives input of Bayer data serving as image data and temporarily stores the Bayer data in a line memory group 11A. Note that the line memory group 11A has the same functionality as the line memory group 11 in FIG. 2.

The Bayer data stored in the line memory group 11A is transmitted to a DCT unit 12A in units of 4×4 or 8×8 pixels in first-in, first-out order. The data is transmitted in succession until four or eight lines of the Bayer data have been transmitted. Note that the DCT unit 12A has the same functionality as the DCT unit 12 in FIG. 2.

The transform coefficients output from the DCT unit 12A are analyzed by a frequency analyzer 13A, and a result of the analysis indicating whether or not the image data in a unit of 4×4 or 8×8 pixels includes noise is stored in an analysis result storage unit 14A that is configured by a memory, for example.

After being stored in the analysis result storage unit 14A, the result of the analysis performed on one frame's worth of image data is transmitted to a single-frame noise determination unit 15A.

The single-frame noise determination unit 15A determines whether or not the one frame's worth of image data is image data that includes noise, i.e., a frame that includes noise, on the basis of the number of Bayer data blocks that have been determined to include noise according to the result of the analysis performed on the one frame's worth of image data.

A result of the determination performed by the single-frame noise determination unit 15A is transmitted to a multiple-frame noise determination unit 16A. The multiple-frame noise determination unit 16A performs final noise determination on the basis of the number of frames that include noise among a predetermined number of a plurality of frames, transmits a control signal based on a result of the determination to the selection circuit 3A, and controls the operation of the selection circuit 3A when selecting image data.

Note that the noise determination apparatus 1A is configured of a CPU, a RAM, a ROM, and a wired logic circuit, for example, and the functionality of the noise determination apparatus 1A is implemented by the CPU executing a program that is stored in and read out of the ROM.

Noise Determination Processing

Figure 21:
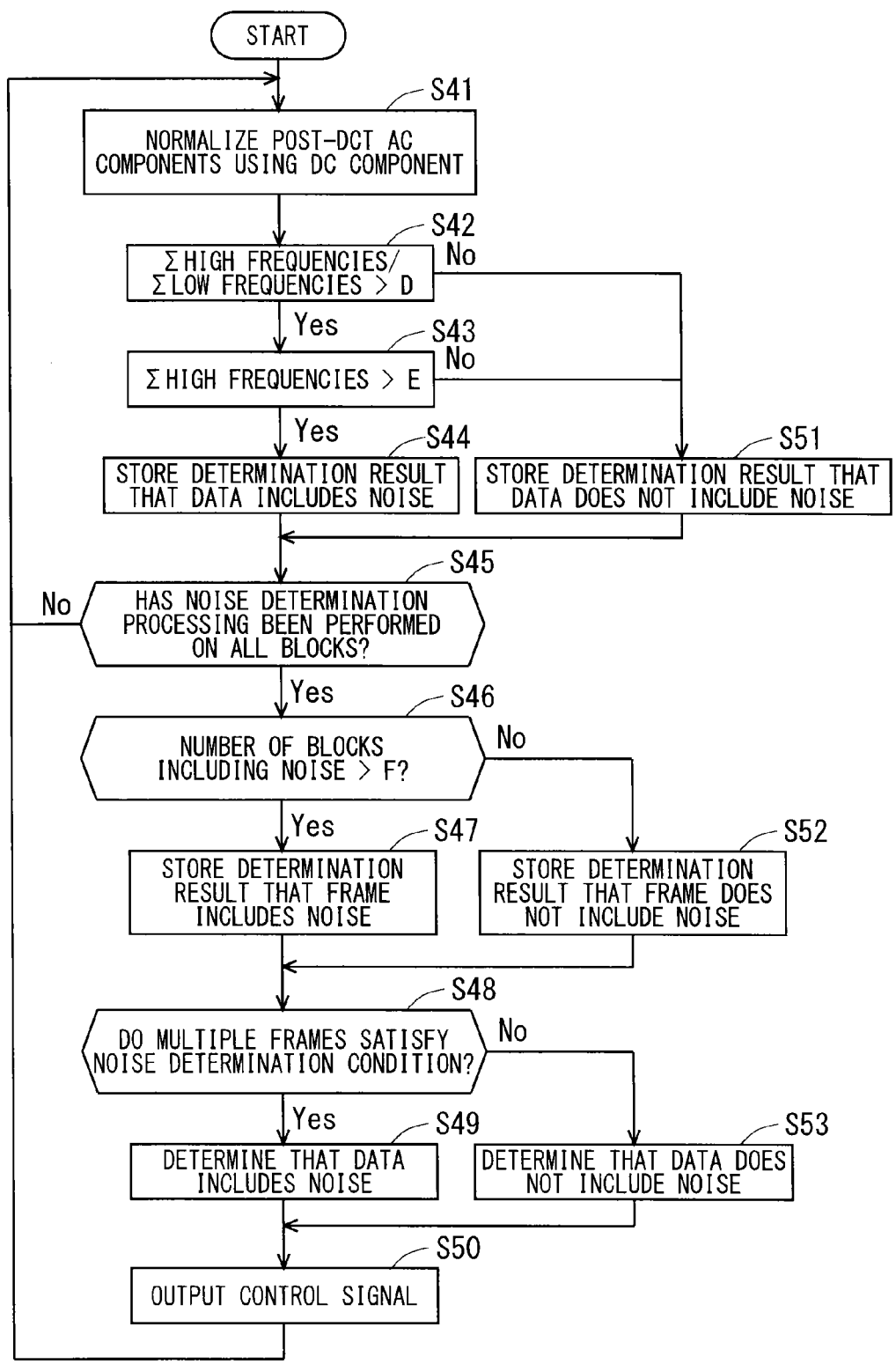
FIG. 21 is a flowchart for explaining processing for determining noise, performed by the noise determination apparatus according to the preferred embodiment of the present invention.

Next is a description of processing for determining noise, performed by the noise determination apparatus 1A, with reference to the flowchart in FIG. 21. The following describes processing from the frequency analyzer 13A onward in FIG. 20, and a description of DCT processing, which is a known technique, will be omitted.

First, in step S41, the frequency analyzer 13A normalizes alternating current (AC) components in a matrix (corresponding to a Bayer data block of 8×8 pixels) of transform coefficients (DCT coefficients) output from the DCT unit 12A by dividing the AC components by a direct current (DC) component in the matrix.

Figure 22:
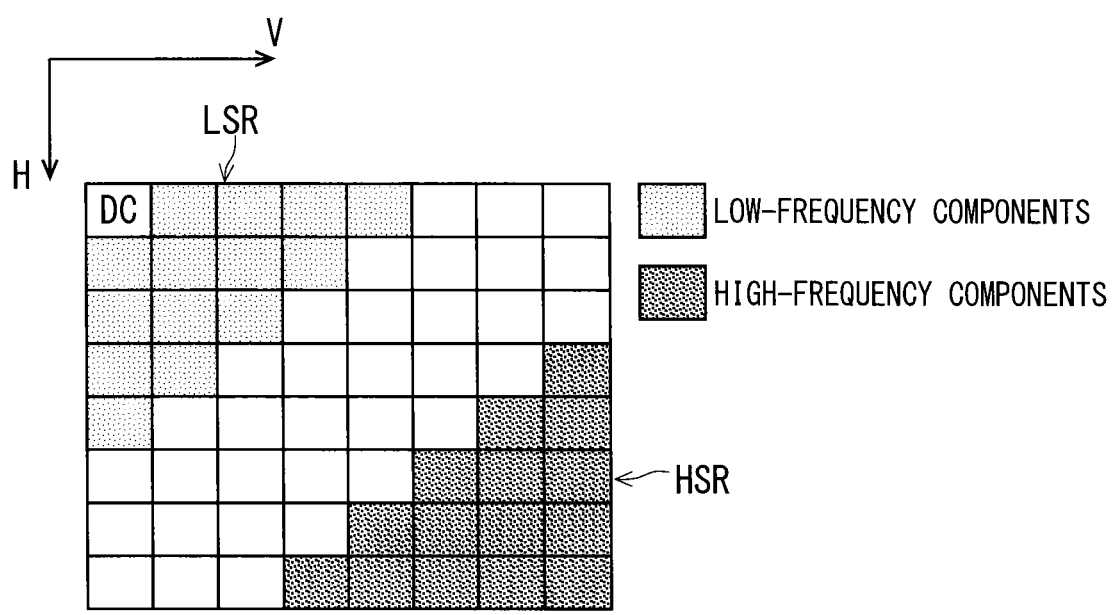
FIG. 22 illustrates a matrix of DCT coefficients, the matrix corresponding to a Bayer data block of 8×8 pixels.

Here, FIG. 22 illustrates a matrix of DCT coefficients that corresponds to a Bayer data block of 8×8 pixels. In FIG. 22, the first element (at the upper left corner) of the matrix is the DC component, elements along the horizontal direction of the matrix are vertical frequency components (V), and elements along the vertical direction of the matrix are horizontal frequency components (H). AC components that are closer to the DC component have lower frequencies, and AC components that are closer to a corner that is diagonally opposite to the DC component in the matrix have higher frequencies.

In FIG. 22, a sampling area of low-frequency components that are AC components located close to the DC component is shown as a sampling area LSR (low-frequency sampling area), and a sampling area of high-frequency components that are AC components located close to the corner diagonally opposite to the DC component is shown as a sampling area HSR (high-frequency sampling area).

Next, in step S42, the frequency analyzer 13A calculates a ratio (Σ high frequencies/Σ low frequencies) of the total number of DCT coefficients normalized in the sampling area HSR (Σ high frequencies) to the total number of DCT coefficients normalized in the sampling area LSR (Σ low frequencies) in FIG. 22, and compares the calculated ratio with a predetermined threshold value D. If the ratio exceeds the threshold value D, the procedure proceeds to step S43. If the ratio is less than or equal to the threshold value D, it is determined that the Bayer data block to be processed does not include noise, and a result of the determination is stored in the analysis result storage unit 14A (step S51). The procedure then proceeds to step S45.

Note that in FIG. 22, the number of frequency components in the sampling area LSR and the number of frequency components in the sampling area HSR are both set to be approximately 30 percent of the total number of frequency components. This is because too large sampling areas can cause difficulty in obtaining a significant result. However, basically the number of frequency components in the sampling areas can be arbitrarily set.

In step S43, the total number of DCT coefficients normalized in the sampling area HSR (Σ high frequencies) is compared with a predetermined threshold value E. This measure is taken in order to cope with the possibility that a small number of high frequency components in a monotonous image, such as an image that includes a greater number of DC components than AC components, will be misrecognized as noise in the determination process performed in step S42. If a result of the comparison in step S43 shows that the number of high-frequency components exceeds the predetermined number, it is determined that the determination in step S42 is correct.

If it is determined in step S43 that the total number of DCT coefficients normalized in the sampling area HSR exceeds the threshold value E, it is determined that the Bayer data block to be processed includes noise, and a result of the determination is stored in the analysis result storage unit 14A (step S44).

Next, in step S45, the frequency analyzer 13A determines whether or not the noise determination processing has been performed on all Bayer data blocks that constitute the single frame. If the noise determination processing has been performed on all of the Bayer data blocks, the procedure proceeds to step S46, and if there is another Bayer data block that has not yet undergone the determination processing, the processing from step S41 onward is repeated.

In step S46, the single-frame noise determination unit 15A determines, on the basis of the determination result stored in the analysis result storage unit 14A, whether or not the number of Bayer data blocks that have been determined to include noise among the one frame's worth of Bayer data is greater than a predetermined threshold value F. If it is determined that the number of Bayer data blocks that include noise is greater than the predetermined threshold value F, it is determined that the corresponding frame includes noise, and a result of the determination is stored in the analysis result storage unit 14A (step S47). On the other hand, if it is determined in step S46 that the number of Bayer data blocks that include noise is less than or equal to the predetermined threshold value F, it is determined that the corresponding frame does not include noise, and a result of the determination is stored in the analysis result storage unit 14A (step S52).

In this case, the threshold value F can be set to an arbitrary number. For example, a frame in which 30% of the total number of Bayer data blocks includes noise may be determined as a frame that includes noise.

Then, the multiple-frame noise determination unit 16A confirms, for example, the number of frames that have been determined to include noise in step S47 and a continuous number of frames that have been determined to include noise, and determines whether or not the plurality of frames satisfy a predetermined specified determination condition (step S48). If the frames satisfy the determination condition, the multiple-frame noise determination unit 16A determines that a moving image includes noise (step S49), and transmits a predetermined control signal to the selection circuit 3A so that data from which noise has been removed is output (step S50). Thereafter, the processing from step S41 onward is repeated until there is no more input of image data, such as in the case where the noise-removing apparatus 200 is turned off.

On the other hand, if it is determined in step S48 that the frames do not satisfy the specified determination condition, the multiple-frame noise determination unit 16A determines that the moving image does not include noise (step S53), and transmits a predetermined control signal to the selection circuit 3A (step S50). Note that the control signal is output in either case where noise is determined to be present or where noise is determined not to be present, and set to, for example, "0" when noise is present and to "1" when noise is not present. The selection circuit 3A performs a selection operation corresponding to the control signal.

Now, the determination process performed in step S48 will be described. A moving image typically consists of 60 frames of images per second. Thus, the determination in step S48 is started after the processing from steps S41 to S47 and step S52 has been performed on 60 frames of image data. The determination process uses a determination condition that if more than half of 60 frames of a moving image include noise, the moving image is determined to include noise, and in this case, a control signal for controlling the selection operation of the selection circuit 3A is output so that as the 61th and subsequent frames of image data, filtered image data from which noise has been removed by the filter circuit 2A is output through the selection circuit 3A.

In other words, non-filtered image data has been output through the selection circuit 3A until the 60 frames of image data that are necessary for the final determination are collected.

Although the 61th and subsequent frames of image data are filtered image data, if the number of frames that do not include noise increases and the above-described determination condition becomes not satisfied in the imaging situation after repetition of the processing from steps S41 to S53, non-filtered image data will be output through the selection circuit 3A.

The reason for the above-described processing is to avoid occurrence of flicker in captured images due to frequent switching on and off of filtering, although performing filtering and not performing filtering cause a great difference in resultant captured images.

Note that the above-described determination condition is not limited to the above number of frames that have been determined to include noise, and may be such that if a predetermined number of frames that have been determined to include noise is continuous, e.g., more than 10 frames out of 60 frames are continuous, the moving image is determined to include a noise, and a control signal for controlling the selection operation of the selection circuit 3A is output so that for the 61th and subsequent frames of image data, filtered image data from which noise has been removed by the filter circuit 2A is output through the selection circuit 3A.

Here, the accuracy of determination can be improved by performing the above-described processing from steps S41 to S43 on each of four colors of input Bayer data, namely, green of blue side (Gb), green of red side (Gr), red (R), and blue (B). Alternatively, the above-described processing from steps S41 to S43 may be performed on only Gb or Gr data because the green components include luminance information.

Variation of Noise Determination Apparatus

Figure 23:
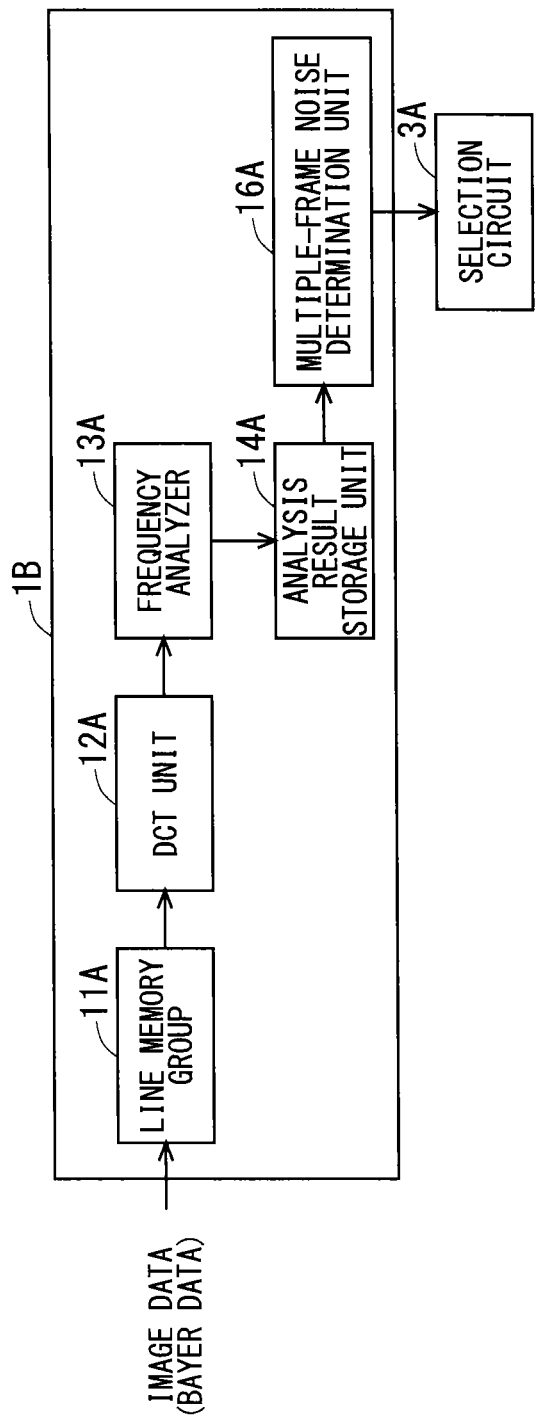
FIG. 23 is a block diagram illustrating a variation of the noise determination apparatus according to the preferred embodiment of the present invention.

The following describes a variation of the noise determination apparatus 1A. FIG. 23 is a block diagram of a noise determination apparatus 1B as a variation of the noise determination apparatus 1A.

As illustrated in FIG. 23, the noise determination apparatus 1B receives input of Bayer data serving as image data and temporarily stores the Bayer data in the line memory group 11A.

The Bayer data stored in the line memory group 11A is transmitted to the DCT unit 12A in units of 4×4 or 8×8 pixels in first-in, first-out order. The data is transmitted in succession until four or eight lines of Bayer data have been transmitted.

The transform coefficients output from the DCT unit 12A are analyzed by the frequency analyzer 13A, and a result of the analysis indicating whether or not the image data in a unit of 4×4 or 8×8 pixels includes noise is stored in the analysis result storage unit 14A.

After being stored in the analysis result storage unit 14A, the result of the analysis performed on the one frame's worth of image data is transmitted to the multiple-frame noise determination unit 16A. The multiple-frame noise determination unit 16A performs final noise determination on the basis of the number of frames that include noise among a predetermined number of a plurality of frames, transmits a control signal based on a result of the determination to the selection circuit 3A, and controls the operation of the selection circuit 3A when selecting image data.

Figure 24:
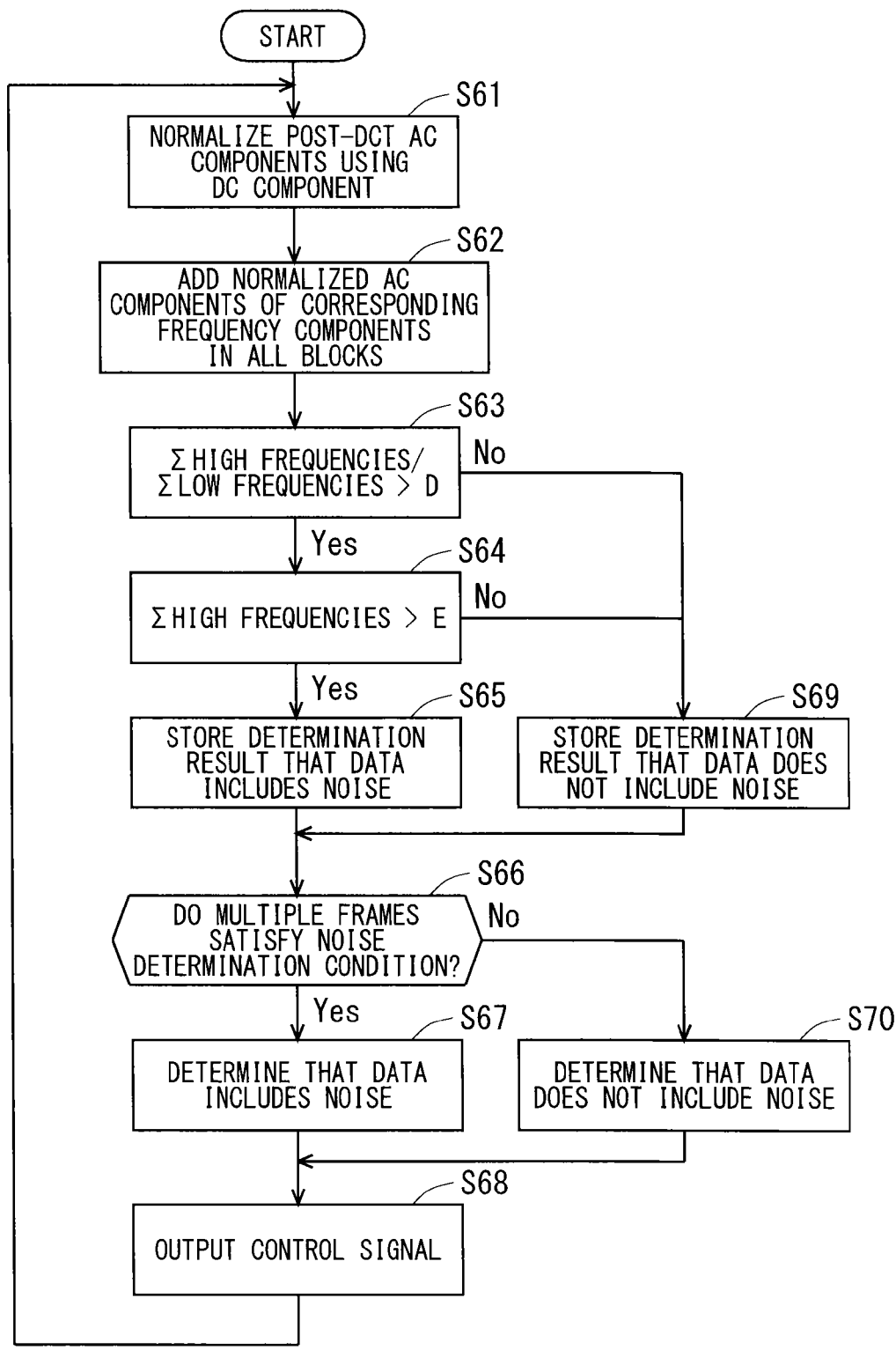
FIG. 24 is a flowchart for explaining processing for determining noise, performed by the variation of the noise determination apparatus according to the preferred embodiment of the present invention.

Next is a description of processing for determining noise, performed by the noise determination apparatus 1B, with reference to the flowchart in FIG. 24.

First, in step S61, the frequency analyzer 13A normalizes alternating current (AC) components in a matrix (corresponding to a Bayer data block of 8×8 pixels) of transform coefficients (DCT coefficients) output from the DCT unit 12A by dividing the AC components by a direct current (DC) component in the matrix.

Next, in step S62, the frequency analyzer 13A adds DCT coefficients of corresponding frequency components in the matrices of normalized DCT coefficients for all of the Bayer data blocks that constitute the single frame. This produces a single matrix (data-integrated matrix) in which the DCT coefficients in all of the matrices are integrated.

Next, the frequency analyzer 13A calculates a ratio (Σ high frequencies/Σ low frequencies) of the total number of DCT coefficients normalized in the high-frequency sampling area (Σ high frequencies) to the total number of DCT coefficients normalized in the low-frequency sampling area (Σ low frequencies) in the data-integrated matrix, and compares the calculated ratio with a predetermined threshold value D. If the ratio exceeds the threshold value D, the procedure proceeds to step S64. If the ratio is less than or equal to the threshold value D, it is determined that the frame to be processed does not include noise, and a result of the determination is stored in the analysis result storage unit 14A (step S69). The procedure then proceeds to step S66.

In step S64, the frequency analyzer 13A compares the total number of DCT coefficients normalized in the high-frequency sampling area (Σ high frequencies) with a predetermined threshold value E. This measure is taken in order to cope with the possibility that a small number of high-frequency components in a monotonous image, such as an image that includes a greater number of DC components than AC components, will be misrecognized as noise in the determination process performed in step S63. If a result of the comparison in step S64 shows that the number of high-frequency components exceeds the predetermined number, it is determined that the determination in step S63 is correct.

If it is determined in step S64 that the total number of DCT coefficients normalized in the high-frequency sampling area exceeds the threshold value E, it is determined that the frame to be processed includes noise, and a result of the determination is stored in the analysis result storage unit 14A (step S65).

Then, the multiple-frame noise determination unit 16A confirms, for example, the number of frames that have been determined to include noise and stored in step S65 and a continuous number of frames that have been determined to include noise, and determines whether or not the plurality of frames satisfy a predetermined specified determination condition (step S66). If the frames satisfy the determination condition, the multiple-frame noise determination unit 16A determines that a moving image includes noise (step S67), and transmits a predetermined control signal to the selection circuit 3A so that data from which noise has been removed is output (step S68). Thereafter, the processing from step S61 onward is repeated until there is no more input of image, such as in the case where the noise-removing apparatus 200 is turned off.

On the other hand, if it is determined in step S66 that the frames do not satisfy the predetermined determination condition, the multiple-frame noise determination unit 16A determines that the moving image does not include noise (step S70), and transmits a predetermined control signal to the selection circuit 3A (step S28). Note that the control signal is output in either case where noise is determined to be present or where noise determined not to be present, and set to, for example, "0" when noise is present and to "1" when noise is not present. The selection circuit 3A performs a selection operation corresponding to the control signal.

Note that the determination operation performed in step S66 is the same as that performed in step S48, which is previously described with reference to FIG. 21.

Here, the accuracy of determination can be improved by performing the above-described processing from steps S61 to S64 on each of four colors of input Bayer data, namely, green of blue side (Gb), green of red side (Gr), red (R), and blue (B). Alternatively, the above-described processing from steps S61 to S64 may be performed on only Gb or Gr data because the green components include luminance information.

Note that the above-described noise determination apparatuses 1A and 1B may each be used independently, or they may be used in parallel with each other for synthetic noise determination based on the results of noise determination processing performed by the two apparatuses.

In other words, the noise determination processing performed by the noise determination apparatus 1A, which determines noise in units of Bayer data blocks, has the feature of being able to accurately determine noise even in a complicated image such as an image that includes a lopsided distribution of areas that are difficult to determine noise.

On the other hand, the noise determination processing performed by the noise determination apparatus 1B, which integrates all areas of the single frame so as to determine noise in the integrated single Bayer data block, has the feature of being suited to use for a simple image, such as an image that has a uniform distribution of noise, because only a small number of processing steps is necessary and noise can be determined relatively easily.

Accordingly, using both of the noise determination apparatuses 1A and 1B makes it possible to combine the above-described two features and to complement each other's drawbacks, thus enabling accurate noise determination.

Setting of Sampling Areas

While the numbers of frequency components in the sampling areas can be set arbitrarily as described previously, they may be set based on the average value of Gb and Gr data in the entire frame.

In other words, since the green components include luminance information, setting the sampling areas according to the luminance (brightness) of the image will achieve the following effects.

For example, when the luminance of the image is high, the number of samples can be reduced because the S/N ratio is high. Thus, the sampling areas LSR and HSR are reduced as illustrated in FIG. 25. Reducing the sampling areas will reduce the amount of data to be processed and increase the processing speed.

On the other hand, when the luminance of the image is low, the sampling areas LSR and HSR are both increased as illustrated in FIG. 26 because the S/N ratio is low. Increasing the number of samples will suppress a reduction in the accuracy of determination.

Note that while FIGS. 22, 25, and 26 illustrate examples in which the sampling areas LSR and HSR each include equal numbers of high- and low-frequency components, each of the sampling areas may include different numbers of high- and low-frequency components.

Advantageous Effects

As described above, the second preferred embodiment according to the present invention allows the presence or absence of noise to be relatively simply and easily determined because the frequency analyzer 13A analyzes the presence or absence of noise by calculating the ratio of Σ high frequencies to Σ low frequencies. Since Bayer data is used as image data to determine noise, the accuracy of noise detection can be improved as compared to the case of using data that is generated by fetching Bayer data and performing color conversion on the Bayer data through interpolation processing.

Note that if the noise determination apparatuses described above are mounted along with a codec on an image processing apparatus or the like, there is an effect of being able to determine the presence or absence of noise with a simpler circuit configuration because the DCT unit and the quantization unit of the codec can be shared.

Other Exemplary Applications

While the above-described first and second preferred embodiments of the present invention explain configurations for determining noise using Bayer data as image data, YCbCr data or YUV data may be used to determine noise.

While the above description takes the example of using a DCT for frequency decomposition, other transform techniques such as a Fast Fourier Transform (FFT) or a wavelet transform may be used in the noise determination processing.

Note that preferred embodiments of the invention can appropriately be modified or partly omitted in various ways without departing from the scope of the invention.

While the invention has been shown and described in detail, the foregoing description is in all aspects illustrative and not restrictive. It is therefore understood that numerous modifications and variations can be devised without departing from the scope of the invention.

What is claimed is:

1. A noise determination apparatus for determining noise in image data that is input in units of frames and a significant edge in an image, said noise determination apparatus comprising circuitry configured to:

decompose said image data into frequency components:

sample a predetermined number of data pieces for low-frequency components that have relatively low frequencies and a predetermined number of data pieces for high-frequency components that have relatively high frequencies from the frequency components; and determine the noise or the significant edge in the image, on the basis of a ratio of high-frequency data to low-frequency data.

2. The noise determination apparatus according to claim 1, wherein said circuitry is configured to divide one frame's worth of said image data into matrices of a predetermined number of pixels, the matrices serving as data blocks, and decompose each data block into frequency components;

sample a predetermined number of low-frequency components and a predetermined number of high-frequency components from the frequency components of said data block to use the low-frequency components as said low-frequency data and use the high-frequency components as said high-frequency data, and analyze whether or not said data block includes an edge image, on the basis of a ratio of said high-frequency data to said low-frequency data; and select a filter characteristic of a filter that removes noise, on the basis of a result of the analysis performed.

3. The noise determination apparatus according to claim 2, wherein the circuitry is configured to set a first sampling area in which said low-frequency data includes a greater number of horizontal frequency components than vertical frequency components, in a case where a ratio of said high-frequency data to said low-frequency data in said first sampling area is less than or equal to a predetermined threshold value, analyze that said data block includes a horizontal edge image, and select a filter characteristic that does not remove said horizontal edge image.

4. The noise determination apparatus according to claim 2, wherein the circuitry is configured to set a second sampling area in which said low-frequency data includes a greater number of vertical frequency components than horizontal frequency components, in a case where a ratio of said high-frequency data to said low-frequency data in said second sampling area is less than or equal to a predetermined threshold value, analyze that said data block includes a vertical edge image, and select a filter characteristic that does not remove said vertical edge image.

5. The noise determination apparatus according to claim 2, wherein the circuitry is configured to set a third sampling area in which said low-frequency data includes equal numbers of vertical frequency components and horizontal frequency components, in a case where a ratio of said high-frequency data to said low-frequency data in said third sampling area is less than or equal to a predetermined threshold value, analyze that said data block includes an edge image, and select a filter characteristic that does not remove said edge image.

6. The noise determination apparatus according to claim 2, wherein the circuitry is configured to decompose a data block into frequency components through a discrete cosine transform, and normalize alternating current components among transform coefficients obtained through the discrete cosine transform by dividing said alternating current components by a direct current component among said transform coefficients, and use the normalized alternating current components as said low-frequency data and said high-frequency data.

7. The noise determination apparatus according to claim 2, wherein said circuitry is configured to analyze whether or not a frequency component is isolated from other frequency components to determine presence or absence of an isolated frequency, analyze whether or not said data block includes an edge image that is unable to be analyzed, on the basis of the presence or absence of said isolated frequency, and in a case where said data block includes an edge image that is unable to be analyzed, select a filter characteristic that does not remove said edge image.

8. The noise determination apparatus according to claim 7, wherein the circuitry is configured to decompose a data block into frequency components through a discrete cosine transform, and normalize alternating current components among transform coefficients that are obtained through the discrete cosine transform by dividing said alternating current components by a direct current component among said transform coefficients, calculate an average value of all normalized alternating current components, calculate, for each of frequency components of said normalized alternating current components, the number of surrounding frequency components that have values greater than said average value, calculate the number of frequency components for which the calculated number of surrounding frequency components is less than a predetermined first threshold value, determine whether or not the calculated number of frequency components is less than a predetermined second threshold value, and if the calculated number of frequency components is less than said second threshold value, analyze that said data block includes an edge image that is unable to be analyzed.

9. The noise determination apparatus according to claim 1, wherein Bayer data serves as said image data.

10. A noise determination apparatus for determining presence or absence of noise in image data that is input in units of frames, said noise determination apparatus comprising circuitry configured to:

decompose said image data into frequency components;

sample a predetermined number of data pieces for low-frequency components that have relatively low frequencies and a predetermined number of data pieces for high-frequency components that have relatively high frequencies from the frequency components; and determine the presence or absence of noise on the basis of a ratio of high-frequency data to low-frequency data.

11. The noise determination apparatus according to claim 10, wherein said circuitry is configured to divide one frame's worth of said image data into matrices of a predetermined number of pixels, the matrices serving as data blocks, and decompose each data block into frequency components; and sample a predetermined number of low-frequency components and a predetermined number of high-frequency components from the frequency components of said data block to use the low-frequency components as said low-frequency data and use the high-frequency components as said high-frequency data, and analyze the presence or absence of noise on the basis of whether or not a ratio of said high-frequency data to said low-frequency data is greater than a predetermined first threshold value.

12. The noise determination apparatus according to claim 11, wherein said circuitry is configured to determine that said one frame's worth of said image data includes noise, in a case where the number of said data blocks that are determined to include noise is greater than a predetermined threshold value.

13. The noise determination apparatus according to claim 12, wherein said circuitry is configured to determine that a moving image includes noise, in a case where a plurality of frames that are determined to include noise satisfy a predetermined determination condition.

14. The noise determination apparatus according to claim 10, wherein said circuitry is configured to divide one frame's worth of said image data into matrices of a predetermined number of pixels, the matrices serving as data blocks, and decompose each data block into frequency components; and sample a predetermined number of low-frequency components and a predetermined number of high-frequency components from the frequency components of said data block to use the low-frequency components as said low-frequency data and use the high-frequency components as said high-frequency data, generate a data-integrated matrix by adding data pieces of corresponding frequency components in all of said data blocks that constitute said one frame's worth of said image data, and analyze the presence or absence of noise on the basis of whether or not a ratio of said high-frequency data to said low-frequency data in said data-integrated matrix is greater than a predetermined first threshold value.

15. The noise determination apparatus according to claim 14, wherein said circuitry is configured to determine that a moving image includes noise, in a case where a plurality of frames that are determined to include noise satisfies a predetermined determination condition.

16. The noise determination apparatus according to claim 13, wherein said determination condition is defined by a ratio of frames that include noise to a plurality of frames that constitute a moving image.

17. The noise determination apparatus according to claim 15, wherein said determination condition is defined by a ratio of frames that include noise to a plurality of frames that constitute a moving image.

18. The noise determination apparatus according to claim 13, wherein
said determination condition is defined by a continuous number of frames that include noise among a plurality of frames that constitute a moving image.

19. The noise determination apparatus according to claim 15, wherein
said determination condition is defined by a continuous number of frames that include noise among a plurality of frames that constitute a moving image.

20. The noise determination apparatus according to claim 11, wherein the circuitry is configured to
decompose a data block into frequency components through a discrete cosine transform, and
normalize alternating current components among transform coefficients obtained through the discrete cosine transform by dividing said alternating current components by a direct current component among said transform coefficients, and use the normalized alternating current components as said low-frequency data and said high-frequency data.

21. The noise determination apparatus according to claim 20, wherein
said circuitry is configured to analyze the presence or absence of noise by further determining whether or not said high-frequency data that has been normalized is greater than a predetermined second threshold value.

22. The noise determination apparatus according to claim 14, wherein the circuitry is configured to
decompose a data block into frequency components through a discrete cosine transform, and
normalize alternating current components among transform coefficients that are obtained through the discrete cosine transform by dividing said alternating current components by a direct current component among said transform coefficients, and use the normalized alternating current components as said low-frequency data and said high-frequency data.

23. The noise determination apparatus according to claim 22, wherein the circuitry is configured to
analyze the presence or absence of noise by further determining whether or not said high-frequency data that has been normalized is greater than a predetermined second threshold value.

24. The noise determination apparatus according to claim 10, wherein Bayer data serves as said image data.

25. A noise determination method performed by a noise determination apparatus for determining noise in image data that is input in units of frames and a significant edge in an image,
the method comprising the steps of:
(a) decomposing said image data into frequency components; and
(b) sampling a predetermined number of data pieces for low-frequency components that have relatively low frequencies and a predetermined number of data pieces for high-frequency components that have relatively high frequencies from the frequency components obtained in said step (a), and determining the noise or the significant edge in the image, on the basis of a ratio of high-frequency data to low-frequency data.

26. A noise determination method for determining presence or absence of noise in image data that is input in units of frames,
the method comprising
inputting the image data into circuitry;
decomposing, in the circuitry, said image data into frequency components; and
sampling, in the circuitry, a predetermined number of data pieces for low-frequency components that have relatively low frequencies and a predetermined number of data pieces for high-frequency components that have relatively high frequencies from the frequency components obtained in said decomposing, and determining, in the circuitry, the presence or absence of noise on the basis of a ratio of high-frequency data to low-frequency data.

* * * * *